(12) United States Patent
Inomata et al.

(10) Patent No.: US 7,177,358 B2
(45) Date of Patent: Feb. 13, 2007

(54) PICTURE CODING APPARATUS, AND PICTURE CODING METHOD

(75) Inventors: Hideki Inomata, Tokyo (JP); Okikazu Tanno, Tokyo (JP); Tokumichi Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 574 days.

(21) Appl. No.: 09/894,214

(22) Filed: Jun. 27, 2001

(65) Prior Publication Data

US 2002/0118748 A1  Aug. 29, 2002

(30) Foreign Application Priority Data

| Jun. 27, 2000 | (JP) | ............................ P2000-192785 |
| Jun. 28, 2000 | (JP) | ............................ P2000-194250 |
| Jun. 28, 2000 | (JP) | ............................ P2000-194253 |

(51) Int. Cl.
*H04B 1/66* (2006.01)

(52) U.S. Cl. ................................. 375/240.12

(58) Field of Classification Search ................
375/240.01–240.29, 240.12; 382/253; H04B 1/66
See application file for complete search history.

(56) References Cited

U.S. PATENT DOCUMENTS

| 4,609,941 | A | * | 9/1986 | Carr et al. ............. 375/240.12 |
| 5,367,629 | A | * | 11/1994 | Chu et al. .................... 382/253 |
| 5,835,147 | A | * | 11/1998 | Florentin et al. ....... 375/240.12 |
| 6,466,625 | B1 | * | 10/2002 | Kobayashi et al. .... 375/240.29 |

FOREIGN PATENT DOCUMENTS

| JP | 04-219089 A | 8/1992 |
| JP | 05-227513 A | 9/1993 |
| JP | 6-70299 A | 3/1994 |
| JP | 06-133295 A | 5/1994 |
| JP | 07-067107 A | 3/1995 |
| JP | 8-163561 | 6/1996 |
| JP | 08-181867 A | 7/1996 |
| JP | 09-051538 A | 2/1997 |
| JP | 09-233475 A | 9/1997 |
| JP | 10-108197 A | 4/1998 |
| JP | 11-196419 A | 7/1999 |
| JP | HEI 11-234668 | 8/1999 |
| JP | 2001-115765 A | 4/2000 |
| JP | 2001-251629 A | 9/2001 |

OTHER PUBLICATIONS

Television Memoir, vol. 49, No. 4, pp. 435-466 (1995).

* cited by examiner

*Primary Examiner*—Tung Vo
(74) *Attorney, Agent, or Firm*—Birch, Stewart, Kolasch & Birch, LLP

(57) ABSTRACT

A picture analyzer detects coding difficulty information by analyzing the source picture data. A picture converter converts the format of the source picture data using spatial conversion or temporal conversion, or both. A coding unit then codes the converted picture data output from the picture converter. A preprocess controller controls the picture converter based on the coding difficulty information, selecting either spatial conversion or temporal conversion, or both. The resulting encoded picture features visually outstanding image quality in which block distortion is not conspicuous, and the coding unit avoids using a coarser than necessary quantization step even when the bit rate is low.

15 Claims, 19 Drawing Sheets

PICTURE CODING APPARATUS, AND PICTURE CODING METHOD

BACKGROUND OF THE INVENTION

1. Field of the Invention

The present invention relates to a picture coding apparatus and a picture coding method for high efficiency encoding of source picture data.

2. Description of Related Art

A picture coding apparatus according to the related art is described in MPEG-2 Test Model 5 as defined in ISO/IEC JTC1/SC29/WG11/N0400 and described briefly below.

FIG. 16 is a block diagram of an image encoder 300 according to MPEG-2 Test Model 5. As shown in FIG. 16, a subtractor 301 obtains the difference between the input video (the source video data) and previously encoded and then decoded picture data. A DCT (discrete cosine transform) converter 302 then converts the difference data obtained by subtractor 301 to frequency domain data, and a quantizer 303 quantizes the frequency domain data passed from DCT converter 302. A variable length coder (VLC) 304 removes redundancy from the quantized data. Buffer 305 smooths and outputs the VLC output from VLC 304 to the transmission path at a certain rate. A dequantizer 306 dequantizes the quantized data from quantizer 303, and an inverse DCT converter 307 inverts the dequantized data from dequantizer 306. Adder 308 then adds the output from inverse DCT converter 307 and the decoded data from n frames before. Note that the data added by adder 308 is hereafter referred to "locally decoded data."

An in-loop frame memory 309 stores the locally decoded data. Motion compensator 310 controls reading from frame memory 309 using a motion vector, the motion vector indicative of the change detected between the source picture data and the locally decoded data. A quantization controller 311 controls the quantization step, and thus controls the bit rate and the image quality of encoded pictures. An activity calculator 312 calculates activity from the source picture data by obtaining the average of the 64 pels in each 8×8 pel block in a frame or field luminance signal, subtracting this average from the pel value of each of the 64 pels, and obtaining the integral of the difference values.

The MPEG-2 standard defines a general coding method known as the Main Profile. Before encoding in the Main Profile, pictures are rearranged from display order to coding order (this step is not shown in the figures), and are coded according to the picture type. There are three picture types: I-pictures (intraframe predictive-coded pictures), P-pictures (forward motion-compensated prediction pictures), and B-pictures (forward/backward motion-compensated interpolated pictures) Methods of accomplishing the Main Profile are well known from the literature, including The Journal of the Institute of Television Engineers of Japan, Vol. 49, No. 4, pp. 435–466 (1995) and others. Methods for controlling the bit rate in. the above-noted Test Model 5 include (1) target data size for the picture, (2) buffer fullness feedback control, and (3) a quantization step based on activity in the source picture data.

FIG. 17 is a block diagram of a conventional picture coding apparatus 320 as taught in Japanese Patent Laid-open Publication (kokai) 11-234668. Shown in FIG. 17 are encoder 321 such as the above-described H.26X or MPEG encoder; prefilter 322; pel count converter 323; and pel count conversion controller 324 for generating a pel count conversion control signal correlated to the filter frequency control signal generated by encoder 321. Based on the code size produced by encoder 321, picture coding apparatus 320 adjusts the frequency of prefilter 322 and drives pel count conversion controller 324 to select the smallest number of pels required at that frequency.

FIG. 18 is a block diagram of a conventional picture coding apparatus 330 as taught in Japanese Patent Laid-open Publication (kokai) 7-107462. Shown in FIG. 18 are encoder 331 such as the above-described H.26x or MPEG encoder; filter 332; adaptive control circuit 333 for controlling the pass-through characteristic of the filter; and prefilter controller 334 for generating a control signal correlated to the data volume produced by the encoder 331. Based on the data volume produced by the encoder 331, this picture coding apparatus 330 controls the pass-through characteristic of the filter from particular local data detected by adaptive control circuit 333 in the picture.

FIG. 19 is a block diagram of a conventional picture coding apparatus 340 as taught in Japanese Patent Laid-open Publication (kokai) 5-103317. Shown in this figure are encoder 341 such as the above-described H.26X or MPEG encoder; delay 342 for delaying the source picture data; difference calculator 343 for obtaining the difference (distortion) between the source picture data delayed by delay 342 and locally decoded data; and quantization parameter controller 344 for controlling the quantization process using the difference data obtained by difference calculator 343 as a control parameter.

It should be noted that other examples of the related art can be found in the following Japanese Patent Laid-open Publications (kokai): 2000-23162; 11-234668; 11-164305; 10-108197; 10-108167; 10-98712; 9-23423; 8-242452; 7-107462; 6-6784; 5-103317; 4-306094; 3-256484; and 63-304769.

Problems that the Invention is to Solve

Motion compensated interframe coding techniques such as MPEG-2 are conceived primarily for application with digital broadcasting and transmission, such as SDTV and HDTV, and storage media, and in broadcast satellite and terrestrial broadcasting where HDTV is the main, a quite low bit rate (20 Mbps or less) is anticipated (see The Journal of the Institute of Image Information and Television Engineers, Vol. 53, No. 11, pp. 1456–1459 (1999)).

Furthermore, MPEG-2 and the conventional picture coding apparatus 80 [sic] are basic control models, and do not provide sufficient image quality Various quantization control methods have therefore been proposed. When a conventional HDTV signal is compression coded according to the MPEG-2 standard, the bit rate satisfying broadcast quality standards based on ITU-R evaluation methods is 22 Mbps or higher (see The Journal of the Institute of Image Information and Television Engineers, Vol. 53, No. 11, pp. 1456–1459 (1999)).

From this article it is obvious that the bit rate must be further reduced (that is, video compression efficiency improved) in order to achieve a single frequency network (SFN) in terrestrial broadcasting media. However, further reducing the bit rate using conventional control methods necessarily requires larger quantization steps, which are known to increase block distortion and create undesirable visual effects.

Picture coding apparatus 320 described above narrows the passband of the prefilter 322 when the encoder 321 produces a large amount of data, broadens the passband when less data is produced, and converts the data to the smallest necessary number of pixels based on the selected filter frequency. However, the amount of data output by the encoder is a result of coding differences between frames, and even if the spatial frequency is controlled, it is often not possible to have any effect.

Furthermore, picture coding apparatus 330 described above is basically a filter 332 process using only data from analyzing the pels around the filtered pel, and is therefore not always able to improve compression efficiency. More particularly, when the compression rate is greatly increased the bandpass frequency used for visually important areas is also limited, often with adverse visual effects.

Furthermore, picture coding apparatus 340 described above can be expected to be effective at relatively high bit rates because it changes the quantization step distribution based on the detected image difference (distortion). At low bit rates, however, the quantization steps are larger overall.

An object of the present invention is therefore to resolve these problems of the related art.

SUMMARY OF THE INVENTION

To achieve this object, a picture coding apparatus according to the invention is characterized by having a picture analyzing unit for analyzing source picture data to obtain coding difficulty information; a picture conversion unit for converting a picture format of the source picture data; an coding unit for encoding picture data converted by the picture conversion unit; and a conversion controller for controlling the picture conversion unit based on the coding difficulty information to convert the picture format using spatial conversion, temporal conversion, or both.

The coding difficulty information in this picture coding apparatus is information about the source picture data, preferably including at least one of the following: spatial frequency component information, noise component information, interframe change information, and interframe motion vector information.

Further preferably, the coding unit encodes picture data based on conversion information input thereto by the picture conversion unit, and multiplexes the conversion information to the picture data.

Yet further preferably, the picture analyzing unit analyzes the source picture data using a specific threshold value.

In addition, the picture analyzing unit preferably determines the threshold value based on a coding result from the coding unit.

A further picture coding apparatus according to the present invention is characterized by having a picture area dividing unit for dividing a screen of source picture data into a plurality of areas; a prefilter for preprocessing the source picture data; a coding unit for coding the source picture data preprocessed by the prefilter; and a filter control unit for controlling a prefilter characteristic by picture area.

The picture area dividing unit of this picture coding apparatus preferably divides the source picture data screen into a middle area and an area therearound.

Further preferably, the picture coding apparatus also has a picture analyzing unit for analyzing a subject type in the source picture data. In this case, the filter control unit controls the prefilter characteristic based on subject information analyzed by the picture analyzing unit.

Yet further preferably, the picture analyzing unit detects a picture detail level based on a variance and/or mean value per small block of at least one of a luminance signal and color difference signal, and identifies a subject type from this detail level.

Yet further preferably, the picture coding apparatus also has a picture analyzing unit for analyzing a subject type in the source picture data. In this case, the picture area dividing unit shifts the middle area based on the subject type analyzed by the picture analyzing unit.

A further picture coding apparatus according to the invention is characterized by having a picture area dividing unit for dividing a screen of source picture data into a plurality of areas; a coding parameter calculating unit for calculating a coding parameter by picture area; and a coding unit for coding the source picture data by switching the coding parameter by picture area.

In this picture coding apparatus, the picture area dividing unit preferably divides the source picture data screen into a middle area and an area therearound.

Yet further preferably, the picture coding apparatus also has a picture analyzing unit for analyzing a subject type in the source picture data. In this case, the coding parameter calculating unit calculates a coding parameter based on subject information analyzed by the picture analyzing unit.

Yet further preferably, the picture analyzing unit detects a picture detail level based on a variance and/or mean value per small block of at least one of a luminance signal and color difference signal, and identifies a subject type from this detail level.

Yet further preferably, the picture analyzing unit detects a subject within a specific level range of a primary color based on a mean color difference signal value per small block, and identifies a subject type from the detected value.

Yet further preferably, the picture coding apparatus also has a picture analyzing unit for analyzing a subject type in the source picture data. In this case, the picture area dividing unit shifts the middle area based on the subject type analyzed by the picture analyzing unit.

Further alternatively, the picture area dividing unit preferably divides the source picture data screen into a plurality of areas based on quantization step information from the coding unit.

A further picture coding apparatus according to the invention is characterized by having a preprocessing unit for preprocessing source picture data; a coding unit for coding source picture data output from the preprocessing unit, and then locally decoding the coded source picture data; and a preprocessing controller for obtaining a difference between the source picture data and locally decoded data output from the coding unit, and controlling the preprocessing unit based on this difference data.

The preprocessing unit preferably has a bandwidth limiter, and the preprocessing controller controls the bandwidth limiter to narrow a frequency band as the difference between the locally decoded data and source picture data increases.

Further preferably, the preprocessing unit has a pel count conversion unit, and the preprocessing controller controls the pel count conversion unit to increase the decimation rate as the difference between the locally decoded data and source picture data increases.

Yet further preferably, the picture coding apparatus also has a scene change detection unit to which the source picture data is input and which detects a scene change when a correlation between temporally adjacent frames is low. In this case, the preprocessing controller controls interrupting operation of the preprocessing unit on temporally adjacent frames where a scene change occurs.

The invention also provides a picture coding method for converting the picture format of source picture data and then coding the converted source picture data, and has a step for converting the picture data format based on coding difficulty information using spatial conversion, temporal conversion, or both.

The coding difficulty information is information about the source picture data, preferably including at least one of spatial frequency component information, noise component information, interframe change information, and interframe motion vector information.

A further picture coding method according to the present invention for coding source picture data after preprocessing the source picture data through a prefilter has a step for: dividing a screen of source picture data into a plurality of areas; and changing a filter characteristic of the prefilter by picture area to preprocess the source picture data.

A further picture coding method according to the present invention for coding source picture data has steps for dividing a screen of source picture data into a plurality of areas; and coding the source picture data by switching the coding parameter by picture area.

A further picture coding method according to the invention has steps for obtaining a difference between the source picture data and locally decoded data that is source picture data coded and then locally decoded; and controlling preprocessing source picture data based on the resulting difference data.

Preferably in this case controlling preprocessing of the source picture data is characterized by narrowing a frequency band as the difference between the locally decoded data and source picture data increases.

Further preferably, controlling preprocessing of the source picture data is characterized by increasing a decimation rate as the difference between the locally decoded data and source picture data increases.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures.

Embodiment 1

Figure 1:
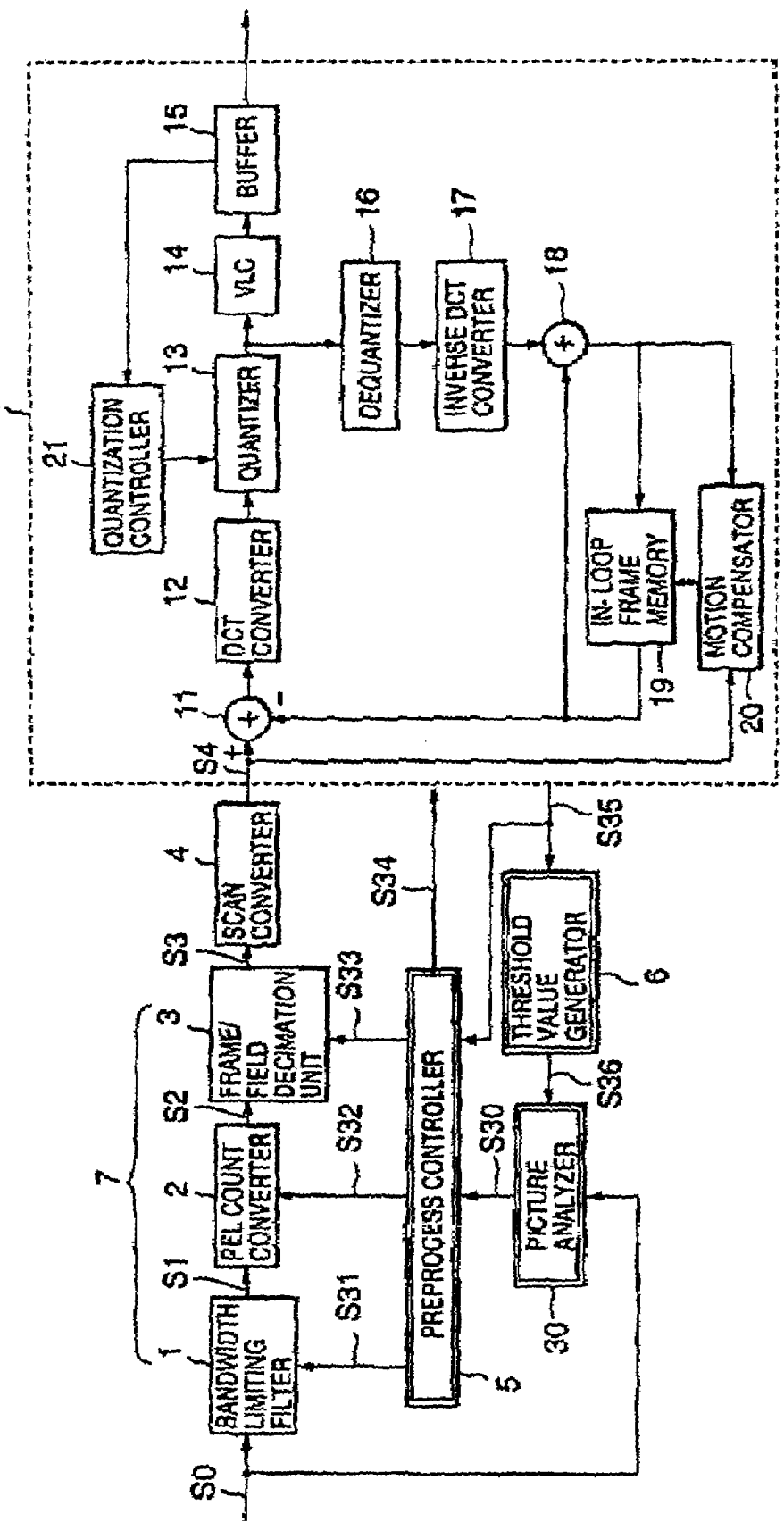
FIG. 1 is a block diagram of a picture coding apparatus according to a first preferred embodiment of the invention.

FIG. 1 is a block diagram of an image encoder according to a first preferred embodiment of the invention. Shown in FIG. 1 are bandwidth limiting filter 1 for limiting the frequency band of source picture data S0; pel count converter 2 to which source picture data S1 passed by bandwidth limiting filter 1 is input for horizontal pel decimation; and frame/field decimation unit 3 for decimating redundant frames or fields, that is, frames or fields having a strong correlation, from the source picture data S2 applied from pel count converter 2.

Note that picture converter 7 comprises at least one of bandwidth limiting filter 1, pel count converter 2 and frame/field decimation unit 3. Note, further, that bandwidth limiting filter 1 and pel count converter 2 accomplish a spatial conversion, and frame/field decimation unit 3 accomplishes temporal conversion. Furthermore, bandwidth limiting filter 1 is preferably a horizontal one-dimensional, or horizontal and vertical two-dimensional, non-recursive (spatial FIR) filter, but shall not be so limited.

Scan converter 4 converts source picture data S3 input thereto from frame/field decimation unit 3 from raster scan data to block scan data for coding Encoder 10 converts the source picture data S4 converted by scan converter 4. Picture analyzer 30 calculates encoding difficulty information for the source picture data S0 input thereto. Preprocess controller 5 (conversion controller) controls bandwidth limiting filter 1, pel count converter 2, and frame/field decimation unit 3 based on the encoding difficulty information calculated by picture analyzer 30. Threshold value generator 6 calculates the threshold value (a to c) used by picture analyzer 30 for calculating the encoding difficulty information.

Referring to the encoder 10 in FIG. 1, subtractor 11 obtains the difference between the applied source picture data S4 and a previous encoded and decoded picture data. DCT converter 12 (orthogonal converter) converts the difference data from subtractor 11 to frequency domain information. Quantizer 13 then quantizes the orthogonally converted data from DCT converter 12. VLC 14 removes redundancy from the quantized data, and buffer 15 smooths and outputs the VLC data from VLC 14 at a certain rate to the transmission path.

Dequantizer 16 dequantizes the data quantized by quantizer 13. Inverse DCT converter 17 then inverse DCT converts the dequantized data from dequantizer 16, and adder 18 adds the data from inverse DCT converter 17 with the decoded data from n frames back, and outputs locally decoded data S5. In-loop frame memory 19 stores the locally decoded data S5 added by adder 18. Motion compensator 20 controls reading from in-loop frame memory 19 by means of a motion vector, which is obtained by detecting the change between source picture data S4 and locally decoded data S5. Quantization controller 21 controls the quantization step, and thus determines the bit rate and encoding picture quality.

Figure 2:
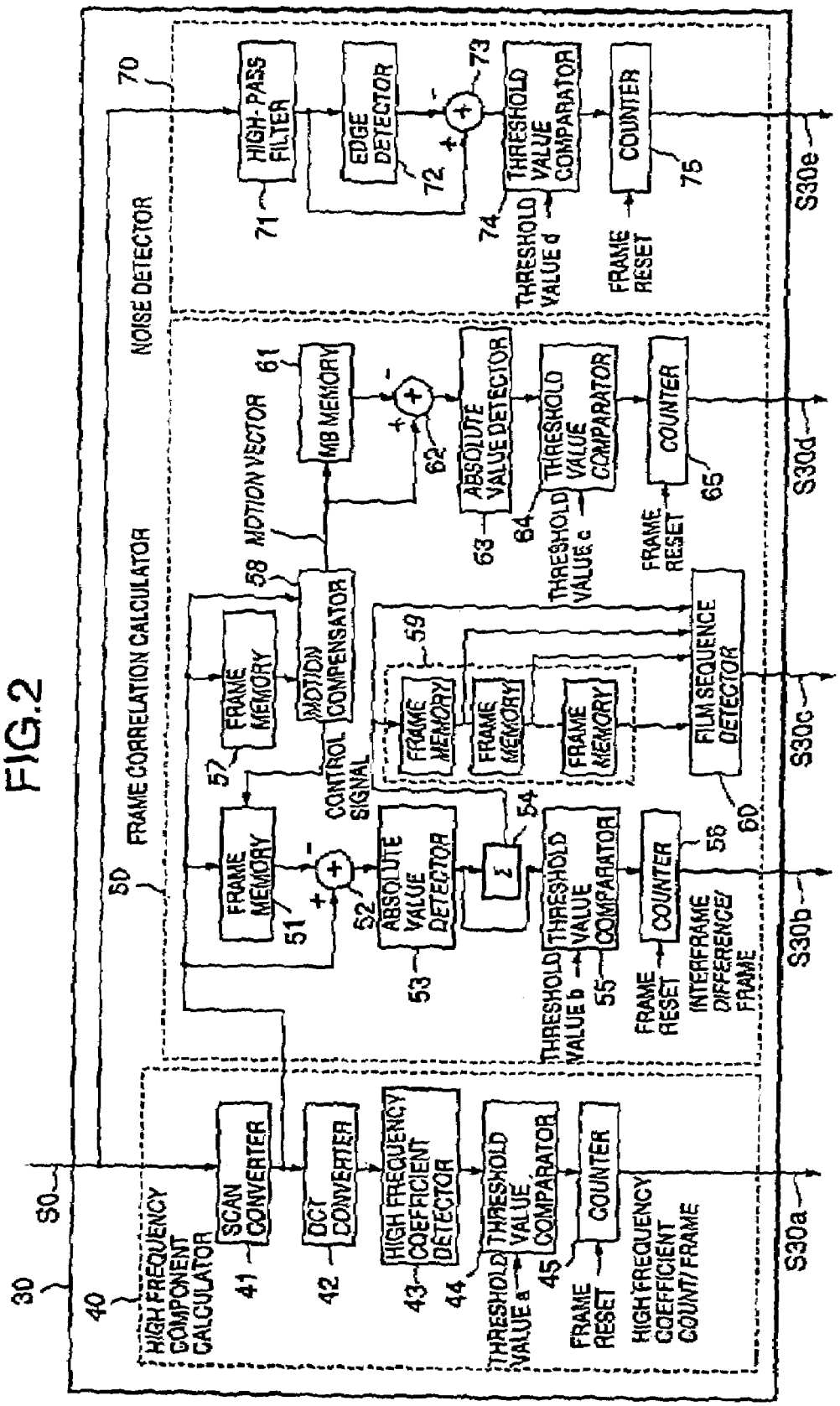
FIG. 2 is a block diagram of the picture analyzer shown in FIG. 1.

Picture analyzer 30 is described next with reference to the block diagram in FIG. 2. Referring to FIG. 2, high frequency component calculator 40 calculates the high frequency component in source picture data S0. High frequency component calculator 40 does this by means of scan converter 41 converting source picture data S0 input thereto from raster scan to block scan data; DCT (or DFT) converter 42 converting the picture data converted by scan converter 41 to frequency domain data; high frequency coefficient detector 43 detecting the high frequency coefficient of the frequency domain data DCT converted by DCT converter 42; threshold value comparator 44 comparing the high frequency coefficient detected by high frequency coefficient detector 43 with a specific threshold value a to extract coefficients exceeding threshold value a; and counter 45 counting the number of coefficients selected by threshold value comparator 44 in a frame.

Frame correlation calculator 50 calculates frame redundancy, that is, the correlation between frames, based on frame difference information. To accomplish this, frame memory 51 stores the converted picture data output from scan converter 41, and subtractor 52 obtains the difference between the converted picture data from scan converter 41 and picture data stored to frame memory 51 to detect a frame difference value. Absolute value detector 53 obtains the absolute value of the difference data from subtractor 52, accumulator 54 accumulates the absolute difference values from absolute value detector 53 to obtain the sum of absolute values for the one frame. Threshold value comparator 55 compares the absolute value obtained by absolute value detector 53 with a specific threshold value b to extract the difference values greater than threshold value b. Counter 56 then counts the number of difference values extracted by threshold value comparator 55 in one frame.

The converted picture data from scan converter 41 is also buffered to frame memory 57 and input to motion compensator 58. Motion compensator 58 compares the picture data from scan converter 41 with the picture data buffered to frame memory 51, calculates the motion vector for the block with the least distortion, and corrects the read address in frame memory 51 based on the resulting vector. Frame memory group 59 stores picture data for the past n frames Film sequence detector 60 detects the film sequence of source picture data S0 based on the total accumulated by accumulator 54, and the picture data stored by frame memory group 59.

Macroblock memory 61 delays the motion vector detected by motion compensator 58 for one macroblock. Subtractor 62 obtains the difference between the motion vector obtained by motion compensator 58 and the motion vector delayed one macroblock by macroblock memory 61 . Absolute value detector 63 obtains the absolute value of the difference obtained by subtractor 62. Threshold value comparator 64 compares the absolute value of the difference detected by absolute value detector 63 with a specific threshold value c to extract the difference values that are greater than threshold value c. counter 65 then counts the number of difference values extracted by threshold value comparator 64 in one frame.

Furthermore, noise detector 70 detects the noise component in source picture data S0. It accomplishes this by means of high-pass filter 71 cutting off the low frequency component of source picture data S0 and passing only the mid to high frequency component. Edge detector 72 detects the edges (that is, adjacent pixels with a strong correlation therebetween) of subjects in the high frequency data passed by high-pass filter 71, and subtractor 73 subtracts the edge components from the high frequency data passed by high-pass filter 71. Threshold value comparator 74 compares the output (noise component) from subtractor 73 with a specific threshold value d to extract high level noise components. Counter 75 then counts the number of noise pixels selected by threshold value comparator 74 in one frame.

Operation of this picture coding apparatus is described next below.

Referring to FIG. 1, source picture data S0 is a component signal comprising a luminance signal and color difference signals (Pb, Pr or Cb, Cr). The preprocess controller 5 controls the operating characteristics of bandwidth limiting filter 1, which thus filters source picture data S0 suitably for coding. Bandwidth limiting filter 1 cuts the high frequency component from the picture data S1 input to pel count converter 2, which then converts the pel count of the picture data according to a decimation control signal from preprocess controller 5.

A typical pel count conversion operation is described next. The horizontal pel count of a 1080i HDTV signal is 1920 pels. Japanese digital broadcasting standards define both 1920 pel and 1440 pel signals, while U.S. digital broadcasting standards additionally define a 1280 pel signal. Because 1440 and 1280 horizontal pel count signals are not defined in the original picture signal standards, they must be generated by decimating pels from a 1920 pel signal. If pels can be appropriately decimated from the original pel count at this stage, the total number of blocks per frame can be reduced for subsequent coding by the coding unit, and the high frequency component is reduced by bandwidth limiting. This has the advantage of improving compression efficiency. This is accomplished by pel count converter 2.

If interframe predictive coding or other predictive coding scheme using past or future frames is used, the block count (pel count) of the predicted frame and the reference frame must be the same. It is therefore necessary to use the frame period in which intra-frame coding is accomplished (that is, I-pictures) as the smallest unit of change. If all pictures are intra-frame coded, this limitation does not apply.

The pel count adjusted picture data S2 is input from pel count converter 2 to frame/field decimation unit 3, which appropriately decimates frames or fields for coding according to the frame/field decimation control signal from preprocess controller 5. Motion pictures (movies) are commonly used as the picture source for broadcasting applications. Such film sources are, however, originally recorded at 24 frames per second (fps), while video cameras record at 30 (29.97) fps. Film source materials are thus converted from 24 to 30 fps for digital broadcasting. This is referred to as a 3:2 pull-down. Field interpolation according to a constant sequence is therefore necessary to convert from 24 fps to 30 fps.

Figure 3:
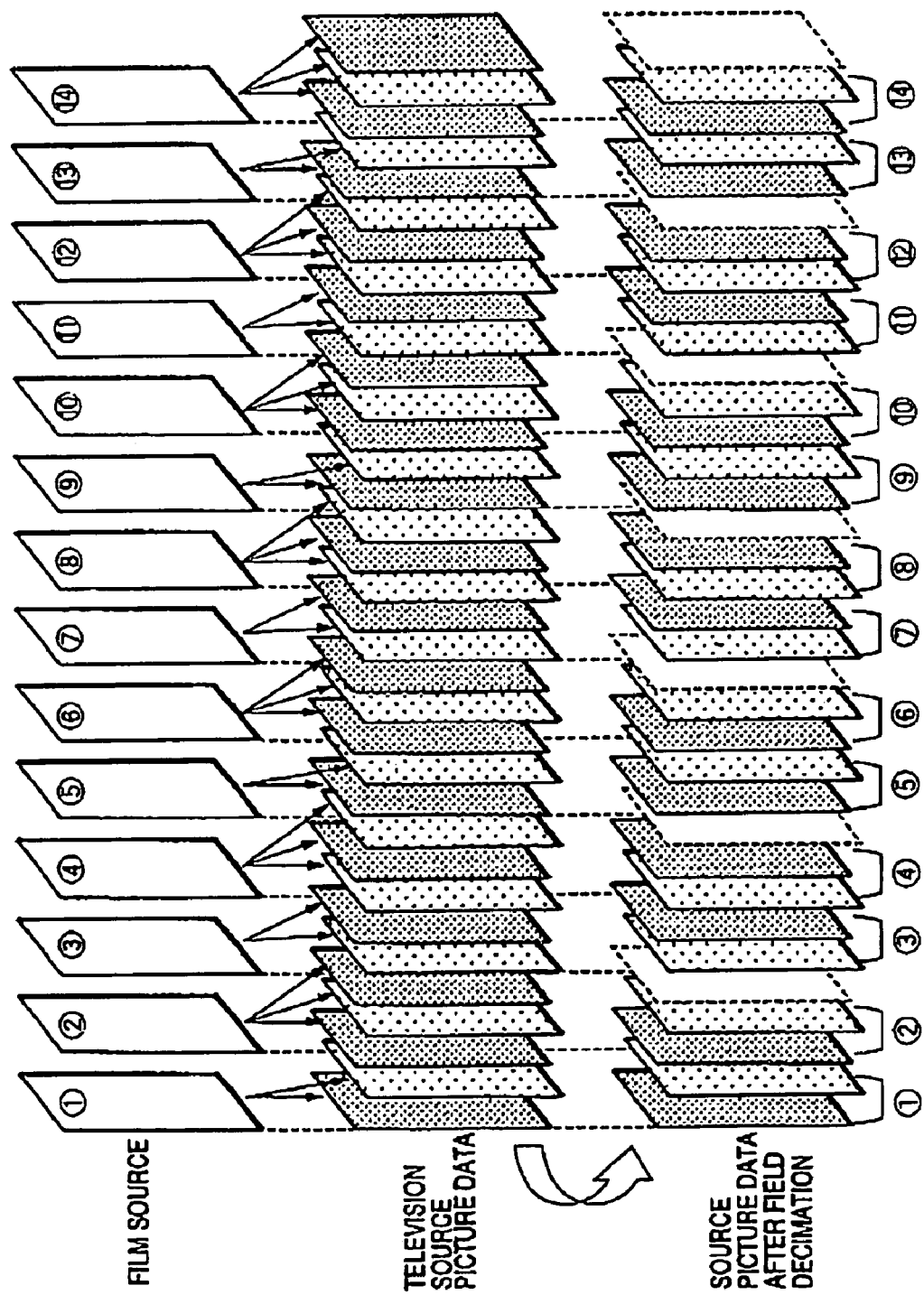
FIG. 3 is used to describe film sequence detection.

To efficiently code such source materials, a picture coding apparatus according to the present invention uses a method for detecting the film sequence by means of frame/field difference analysis. As shown in FIG. 3, frame/field decimation unit 3 separates each progressive frame of the film source into even and odd interlaced fields, and decimates fields at a specific interval (every fifth field in this example).

The decimated picture data S3 output from frame/field decimation unit 3 is then input to scan converter 4 whereby it is converted to block scan data as required for coding by encoder 10. One DCT block in MPEG-2, for example, is defined as 8 pels by 8 lines, and one macroblock as 16 pels by 16 lines. The picture data S4 output from scan converter 4 is input to encoder 10 for coding.

In encoder 10, picture data S4 is first input to subtractor 11 whereby the difference between picture data S4 and picture data stored to in-loop frame memory 19 is obtained. This difference data is input to DCT converter 12 and converted to frequency domain data. The frequency domain data is passed to quantizer 13 whereby it is quantized as controlled by quantization controller 21. Redundancy is removed from the quantized data by VLC 14, and the resulting data is then smoothed and output to the transmission path at a constant bit rate by buffer 15.

Quantizer 13 also passes the quantized data to dequantizer 16 for dequantization. The dequantized data is then inverse DCT converted by inverse DCT converter 17, and the result is added by adder 18 to the coded data from n frames before. Adder 18 outputs this locally decoded data to in-loop frame memory 19 and motion compensator 20. The motion compensator 20 controls reading from in-loop frame memory 19 based on the locally decoded data from adder 18 and the picture data S4 from scan converter 4.

As noted above, source picture data S0 is also input to picture analyzer 30. The picture analyzer 30 calculates degree of coding difficulty information by analyzing the characteristics of the source picture, passes the coding difficult information to preprocess controller 5, and by thereby controlling bandwidth limiting filter 1, pel count converter 2, and frame/field decimation unit 3, achieves picture data suitable for high efficiency compression coding. The coding difficulty information S30 calculated by picture analyzer 30 is input to preprocess controller 5.

The preprocess controller 5 has control condition tables for determining the conditions for changing the operating characteristics of bandwidth limiting filter 1, the decimation rate of pel count converter 2, and the decimation frame/field of frame/field decimation unit 3. Preprocess controller 5 analyzes the coding difficulty information S30 from picture analyzer 30 with reference to these tables to generate control signals S31 to S33. Control signal S31 is applied to bandwidth limiting filter 1, control signal S32 to pel count converter 2, and control signal S33 to frame/field decimation unit 3, to optimally control preprocessing source picture data S0. It is therefore possible to achieve a coded picture with excellent visual quality in which block distortion is not conspicuous even with low bit rate code transmission.

Preprocess controller 5 also passes conversion information S34 concerning the bandwidth limiting result, pel conversion result, and frame/field decimation result to encoder 10. The encoder 10 uses the necessary conversion information S34 (horizontal pel count and frame decimation data) to accomplish the coding process. When transmitting the picture data, the picture format preprocessed using the horizontal—size or repeat_first_field identifiers can be sent as the sequence layer or picture layer side information of the MPEG-2 standard, for example. The encoder 10 applies conversion information S34 to VLC 14, and writes the pel count per frame, decimation field, and other conversion information S34 to the side information area of the picture data. This makes it possible for the decoder to reference conversion information S34 so that the picture data coded with high efficiency by means of bandwidth limiting, pel count conversion, and frame/field decimation can be reliably decoded to the source picture data.

Operation of picture analyzer 30 is described next below with reference to FIG. 2.

As noted above, source picture data S0 is input to scan converter 41 of high frequency component calculator 40 for raster scan to block scan conversion. The resulting block scan picture data is passed to DCT converter 42 and frame correlation calculator 50. DCT converter 42 converts the picture signal from the spatial domain to a two-dimensional frequency domain.

The conversion unit used by DCT converter 42 shall not be specifically limited, and is by way of example only the same 8 pel by 8 line DCT block used by the DCT converter 12 of encoder 10 above. Furthermore, while discrete cosine transformation (DCT) is used in this first preferred embodiment of the invention, the object of this operation is conversion to the frequency domain and it will be obvious to one with ordinary skill in the related art that other methods whereby frequency domain conversion is accomplished can be used. For example, the same effect can be accomplished by means of a Fourier transform (DFT) operation.

The coefficient (8×8=64) of the frequency domain obtained by DCT converter 42 is input to high frequency coefficient detector 43 where only the high frequency component is separated. This is described below with reference to FIG. 4.

Figure 4:
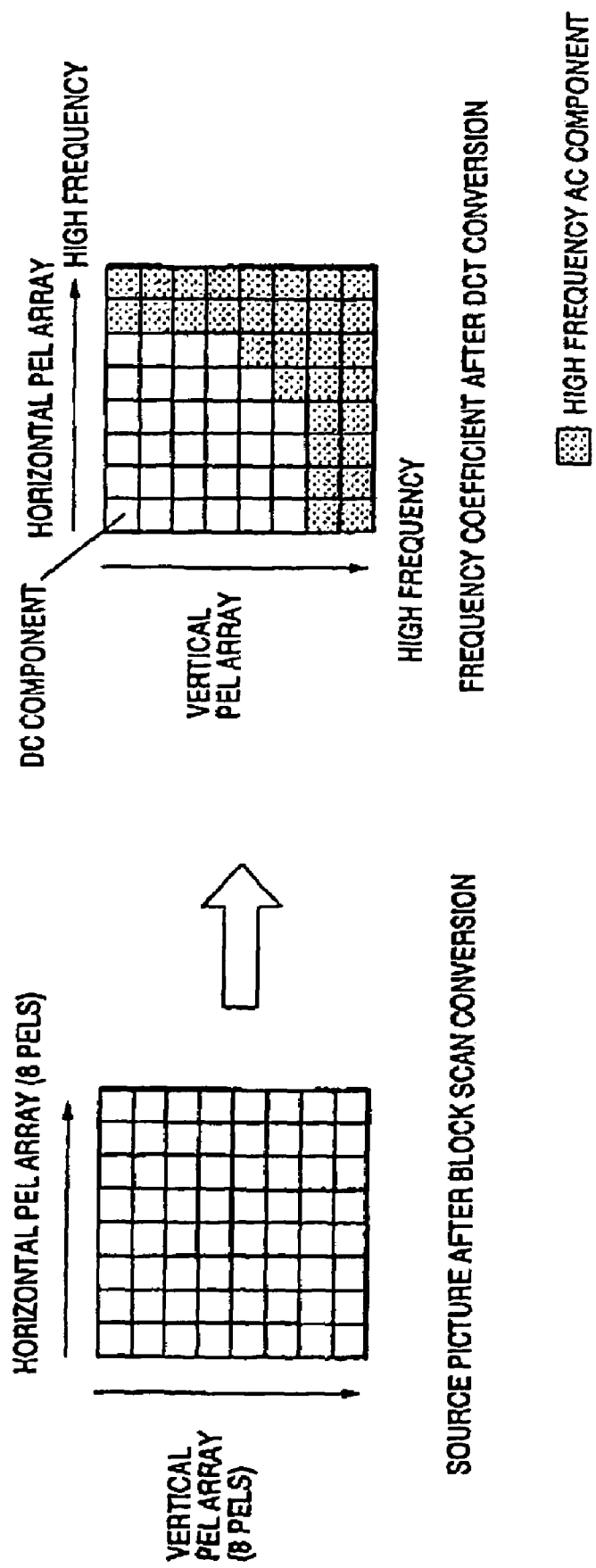
FIG. 4 shows the process of a high frequency coefficient detector.

FIG. 4 shows the separation of 31 high frequency components from the total of 64 coefficients. The high frequency components separated by high frequency coefficient detector 43 are then compared by threshold value comparator 44 with threshold value a. Threshold value comparator 44 selects only those high frequency components greater than or equal to threshold value a, and counter 45 then counts the number of such high frequency components in one frame. The counter 45 sends the resulting high frequency component count S30$a$ to preprocess controller 5.

Operation of frame correlation calculator 50 is described next. The block scan converted picture data from scan converter 41 is input to frame memory 51, frame memory 57, subtractor 52, and motion compensator 58. Using macroblocks in the present frame and past frame as the motion detection unit, motion compensator 58 searches for distortion between a macroblock in the current frame, and the macroblock at the same position and macroblocks adjacent thereto in the previous frame, to calculate a vector for the macroblock with the least distortion. This is referred to as a motion vector. By using this motion vector to control reading from frame memory 51, subtractor 52 can detect the difference between the current and previous frames so that this difference can be reduced.

It should be noted that motion compensator 58 performs an essential function for motion-compensated interframe predictive coding by encoder 10, and in general motion compensation performance greatly affects the compression rate. That is, the accuracy and appropriateness of the calculated motion vector determines how much interframe difference distortion can be reduced, and it will be obvious that motion compensator 58 preferably accomplishes high precision motion detection over the broadest possible area.

The difference detected by subtractor 52 is applied to absolute value detector 53, which detects the absolute value of the difference and passes the result to accumulator 54 and threshold value comparator 55. The threshold value comparator 55 compares this absolute value with a specific threshold value b. If the level of the absolute value is greater than or equal to threshold value b, counter 56 increments one frame count.

The resulting count S30$b$ indicates the difference per frame (screen). This count S30$b$ can be used to detect scene changes (a scene change occurs when count S30$b$ is greater than or equal to a predefined value), or coding difficulty (if count S30$b$ is less than or equal to a predefined value but the level is high, coding difficulty is high). The interframe difference count S30$b$ output from counter 56 is also supplied to preprocess controller 5.

Accumulator 54 obtains the intra-frame sum of absolute difference values, and sequentially stores the sum divided by the pel count to frame memory group 59. Output from each memory unit in the group is input to film sequence detector 60. If memory group output matches a specific sequence of plural frames, it is recognized as a film signal inserted between pictures, and film sequence detection information S30$c$ is applied to preprocess controller 5.

The motion vector detected by motion compensator 58 is supplied to macroblock memory 61 and subtractor 62. Subtractor 62 obtains the difference between the motion vector delayed one macroblock by macroblock memory 61 and the undelayed motion vector. This difference vector is applied to absolute value detector 63, which obtains the absolute value thereof. The absolute value detector 63 passes the resulting absolute difference value to threshold value comparator 64 for comparison thereby with a threshold value c. If the level of the absolute value is greater than or equal to threshold value c, variation between vectors is high and counter 65 increments one. Counter 65 thus counts vector variation S30$d$ per frame, and supplies the result to preprocess controller 5.

When subject matter in a picture moves at times other than scene changes, the motion vectors of adjacent macroblocks typically indicate a close direction, but there is much variation in the motion vectors of a complex and detailed pattern (such as grass). Variation in the motion vector means an increase in the code output by encoder 10. However, by referencing motion vector variation S30$d$, preprocess controller 5 can appropriately change the picture format.

Operation of noise detector 70 is described next.

Source picture data S0 is also input to high-pass filter 71, which eliminates the low frequency component. The major reason for eliminating the low frequency component is that the greater part of the noise component is contained in the mid- to high frequency range, and noise that interferes with coding is also found in the mid- to high frequency range. Most of the frequency components contained in the picture data after passing high-pass filter 71 are noise components and relatively high frequency components (edges) in the subject.

The filtered signal is then applied to both edge detector 72 and subtractor 73. Based on the correlation between adjacent pels edge, detector 72 considers pels with a strong correlation to be image components, and extracts only pels with a strong correlation. The picture data extracted by edge detector 72 is passed to subtractor 73, which subtracts this picture data from the picture data supplied from high-pass filter 71, and thereby extracts the noise component. This noise component data is then supplied to threshold value comparator 74 for comparison with a threshold value d. If the level of the noise component data is greater than or equal to threshold value d, it is determined that a high level noise component was extracted and counter 75 increments one. The noise component count S30$e$ per frame accumulated by counter 75 is supplied to preprocess controller 5. Because a higher noise component count S30$e$ means a higher noise component population, preprocess controller 5 can determine that coding difficulty is high.

Figure 5:
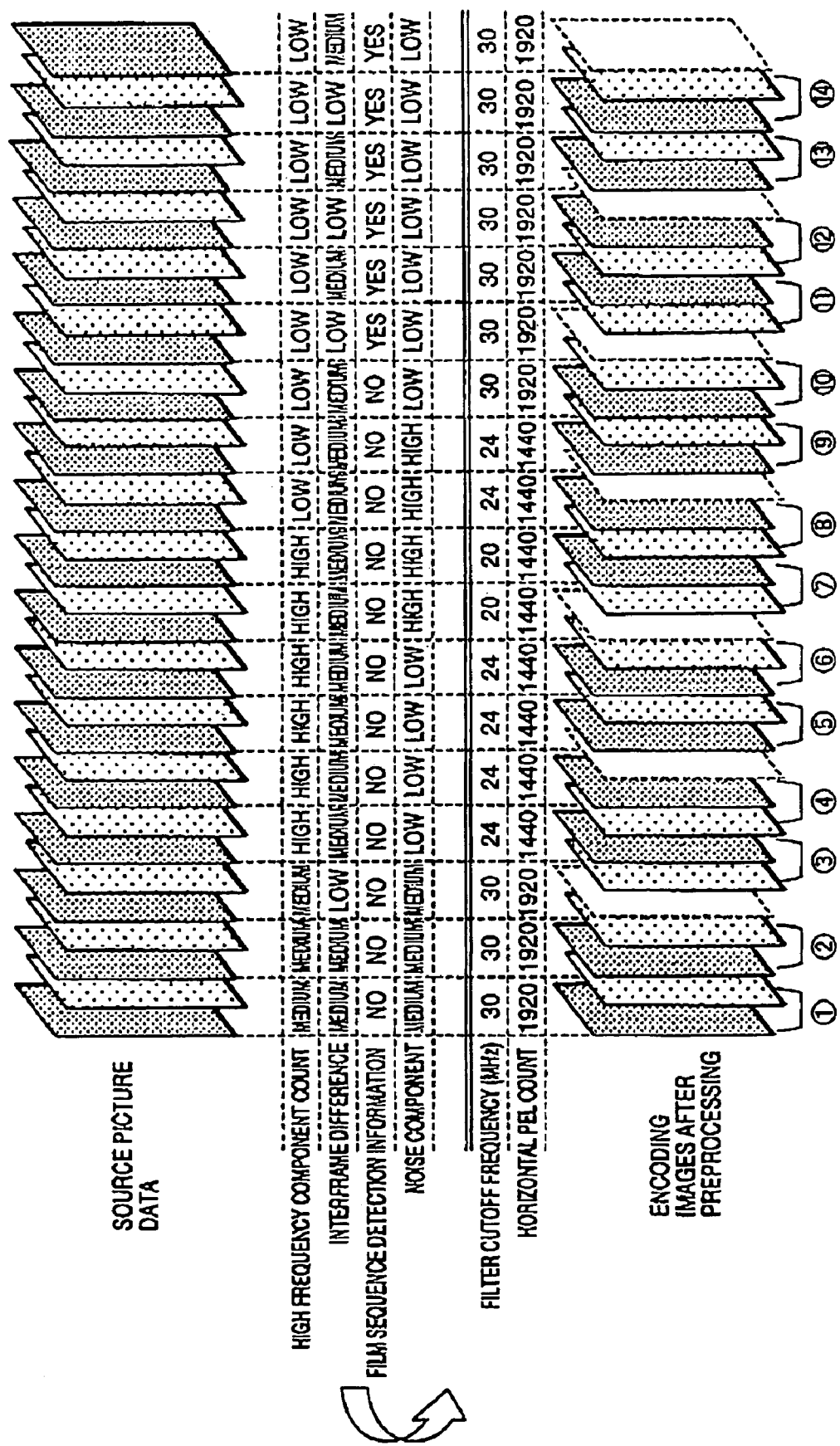
FIG. 5 shows the process of the preprocess controller shown in FIG. 1.

A specific example of control by preprocess controller 5 is described next below with reference to FIG. 5. When high frequency component count S30$a$ input from high frequency component calculator 40 increases from "medium" to "high," preprocess controller 5 controls bandwidth limiting filter 1 to lower the filter cutoff frequency from 30 MHz to 24 MHz, and controls pel count converter 2 to lower the horizontal pel count from 1920 to 1440.

When high frequency component count S30$a$ decreases from "high" to "low", preprocess controller 5 controls bandwidth limiting filter 1 to raise the cutoff frequency from 20 MHz to 24 MHz.

The reason for this control method is that when high frequency component count S30$a$ is high, eliminating high frequency components has little effect on the picture. Likewise, when high frequency component count S30$a$ is high, reducing the horizontal pel count has little effect on the picture. It is therefore possible for the encoder 10 to achieve high compression coding when high frequency component count S30$a$ is high by lowering the cutoff frequency of bandwidth limiting filter 1 to increase the amount eliminated by the bandwidth limiting filter 1, and reducing the horizontal pel count by means of pel count converter 2.

Furthermore, when frame difference count S30$b$ supplied by frame correlation calculator 50 is low, preprocess controller 5 controls frame/field decimation unit 3 to decimate fields. The reason for this is that when frame difference count S30$b$ is low, decimating some fields will not easily cause jerky motion. It is therefore possible for the encoder 10 to achieve high compression coding when frame difference count S30$b$ is low by decimating fields or frames.

Furthermore, when film sequence detection information S30$c$ from frame correlation calculator 50 is "yes," preprocess controller 5 controls frame/field decimation unit 3 to decimate fields. The reason for this is that when film sequence detection information S30$c$ indicates "Yes," the frames in a certain interval are a film signal (that is, a signal inserted to match the frame count per time unit to a desired standard). It is therefore possible for encoder 10 to achieve high compression coding when film sequence detection information S30$c$ is "Yes" by decimating the frames corresponding to the film signal.

Furthermore, when the noise component count S30$e$ from noise detector 70 goes from "low" to "high," preprocess controller 5 controls bandwidth limiting filter 1 to lower the cutoff frequency from 24 MHz to 20 MHz. When the noise component count S30$e$ goes from "high" to "low", it controls bandwidth limiting filter 1 to raise the cutoff frequency from 24 MHz to 30 MHz.

The reason for this is that when noise component count S30$e$ is high, cutting out the high frequency component will have little effect on the picture. Therefore, by lowering the cutoff frequency of bandwidth limiting filter 1 to increase cutoff by the filter when noise component count S30$e$ is high, encoder 10 can achieve high compression coding.

A method for appropriately controlling the above-noted threshold values is described next. Information about the result of coding by encoder 10 is supplied to threshold value generator 6. Various results from encoder 10 can be used for this coding result information. In this exemplary embodiment of the invention the resulting code size is used. Threshold values a to c in FIG. 2 can be fixed to some particular values, but the effectiveness of these threshold values can be improved by applying coding result information S35.

For example, when preprocess controller 5 applies an adaptive preprocessing operation based on the coding difficulty information from picture analyzer 30, the threshold values may not be appropriate if the size of the generated code is great relative to the set coding rate. Therefore, by using the resulting code size as the coding result information S35 and lowering the threshold values when the resulting code is large, more specifically changing the threshold values so as to increase high frequency component elimination, increase the frame difference, or increase the noise component, stronger bandwidth limiting, pel decimation, or field decimation can be achieved, thus contributing to reducing the code generated by the coding operation.

It will be obvious to one with ordinary skill in the related art that the same effect can be achieved by inputting coding result information S35 directly to preprocess controller 5, and directly incorporating coding result information S35 in the control tables (not shown in the figures) of preprocess controller 5, instead of coding result information S35 controlling the threshold values.

Embodiment 2

Figure 6:
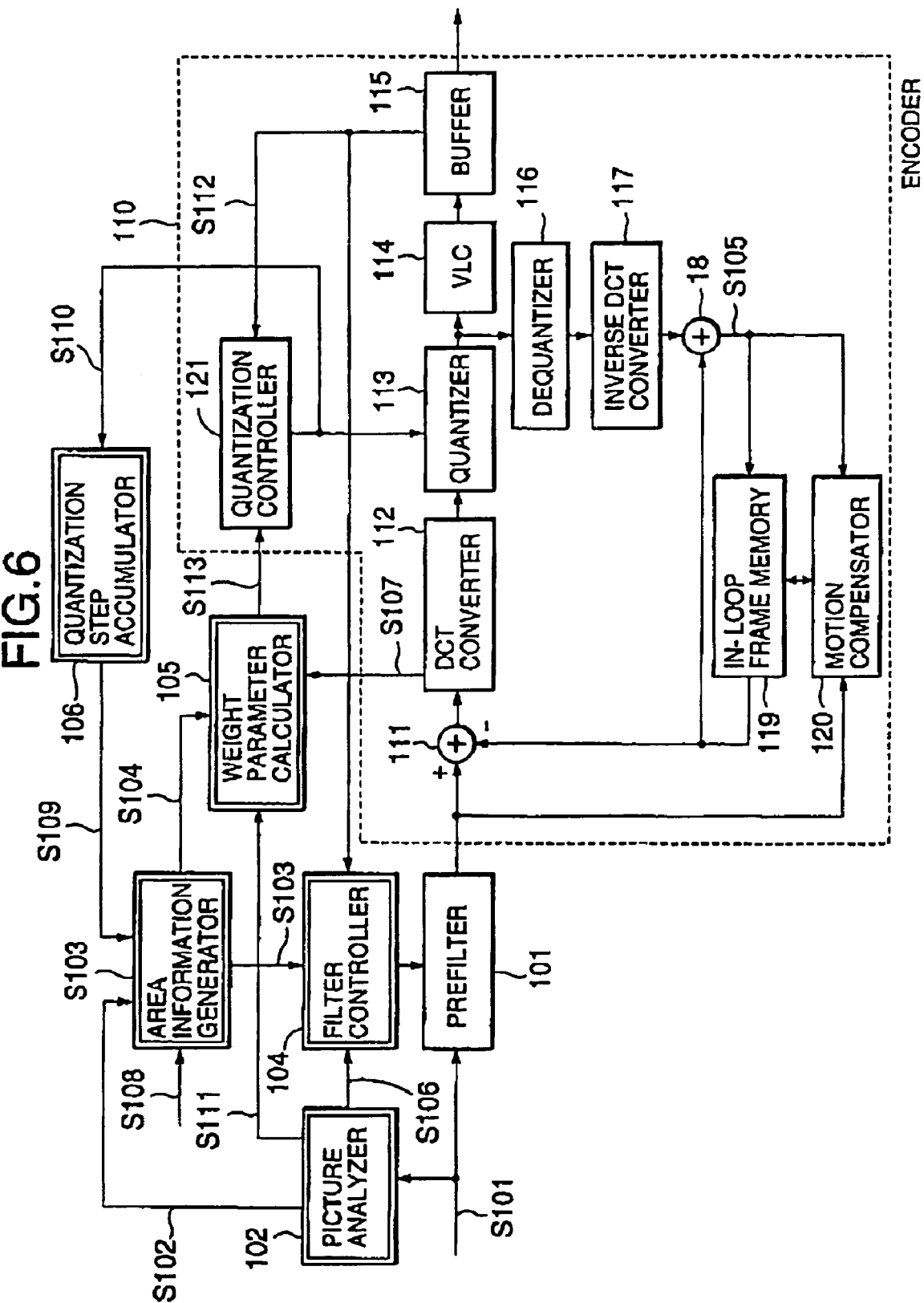
FIG. 6 is a block diagram of a picture coding apparatus according to a second preferred embodiment of the invention.

FIG. 6 is a block diagram of a picture coding apparatus according to a second preferred embodiment of the present invention.

Referring to FIG. 6, prefilter 101 preprocesses source picture data S101 by such operations as bandwidth limiting and noise elimination. Picture analyzer 102 analyzes source picture data S101 to identify the subject type. Using feature data S102 from picture analyzer 102, area information generator (area separator) 103 divides each frame of source picture data S101 into a plurality of subject areas.

Filter controller 104 changes the transfer function and type of prefilter 101 based on area information S103 from area information generator 103. Weight parameter calculator (coding parameter calculator) 105 calculates the parameter used for determining the quantization step based on area information S104 output from area information generator 103. Encoder 110 codes the source picture data S101 preprocessed by prefilter 101. Quantization step accumulator 106 accumulates the quantization steps used by encoder 110.

It should be noted that when source picture data S101 is input to encoder 110, encoder 110 encodes source picture data S101 with the source picture data S101 converted from raster scan data (that is, scanning in the screen display sequence) to block scan data (that is, scanning within the plural smaller blocks of plural pels into which each picture is converted). Furthermore, while a functional block for scan conversion is not shown in FIG. 6, prefilter 101 can operate on raster scan data or block scan data depending on the specific type of prefilter implementation selected, and where scan conversion occurs is therefore not specifically addressed herein.

Subtractor 111 obtains the difference between the applied source picture data S101 and a previous encoded and decoded picture data. DCT converter 112 (orthogonal converter) converts the difference data from subtractor 111 to frequency domain information. Quantizer 113 then quantizes the DCT converted data from DCT converter 112. VLC 114 removes redundancy from the quantized data, and buffer 115 smooths and outputs the VLC data from VLC 114 at a certain rate to the transmission path.

Dequantizer 116 dequantizes the data quantized by quantizer 113. Inverse DCT converter 117 then inverse DCT converts the dequantized data from dequantizer 116, and adder 118 adds the data from inverse DCT converter 117 with the decoded data from n frames back, and outputs locally decoded data S105.

In-loop frame memory 119 stores the locally decoded data S105 added by adder 118. Motion compensator 120 controls reading from in-loop frame memory 119 by means of a motion vector, which is obtained by detecting change in the picture based on source picture data S101 and locally decoded data S105. Quantization controller 121 controls the quantization step, and thus determines the bit rate and encoding picture quality.

Basic operation of this picture coding apparatus is described next below with reference to FIG. 6.

Referring to FIG. 6, source picture data S101 is a component signal comprising a luminance signal and color difference signals (Pb, Pr or Cb, Cr). This source picture data S101 is input to prefilter 101, which filters it suitably for encoding. The transfer function and filter type of prefilter 101 is controlled by filter controller 104.

The filtered source picture data S101 is passed by prefilter 101 to encoder 110 for coding.

In encoder 110, the source picture data S101 is first applied to subtractor 111, which detects the difference between source picture data S101 and the picture data stored to in-loop frame memory 119. The resulting difference data is input to DCT converter 112 for conversion to frequency domain data. The frequency domain data is applied to quantizer 113, which controlled by quantization controller 121 quantizes the data. Redundancy is removed from the quantized data by VLC 114, smoothed at a specific bit rate and output to the transmission path by buffer 115.

The quantized data is also passed from guantizer 113 to dequantizer 116 for dequantization. The dequantized data is then inverse DCT converted by inverse DCT converter 117, and the result is added by adder 118 to the coded data from n frames before. Adder 118 outputs this locally decoded data S105 to in-loop frame memory 119 and motion compensator 120. The motion compensator 120 controls reading from in-loop frame memory 119 based on the locally decoded data S105 from adder 118 and the source picture data S101 from prefilter 101.

The source picture data S101 is also input to picture analyzer 102 which compares the picture data with a database of image subjects (not shown in the figure) based on visual characteristics to extract the nearest subject type. The extracted feature data S102 and quantization step distribution S109 output from quantization step accumulator 106 are applied to area information generator 103. Based on S102 and S109, area information generator 103 generates area information S104.

Area information generator 103 sends the resulting area information S104 to weight parameter calculator 105. Using this area information S104 from area information generator 103 and difference data S107 from encoder 110, weight parameter calculator 105 generates the weighting parameter whereby quantization controller 121 sets the quantization step.

It should be noted that while this encoder 110 is described applying the difference data S107 detected by subtractor 111 to weight parameter calculator 105, the output from DCT converter 112 can be applied, or the output from motion compensator 120 can be applied.

Figure 7:
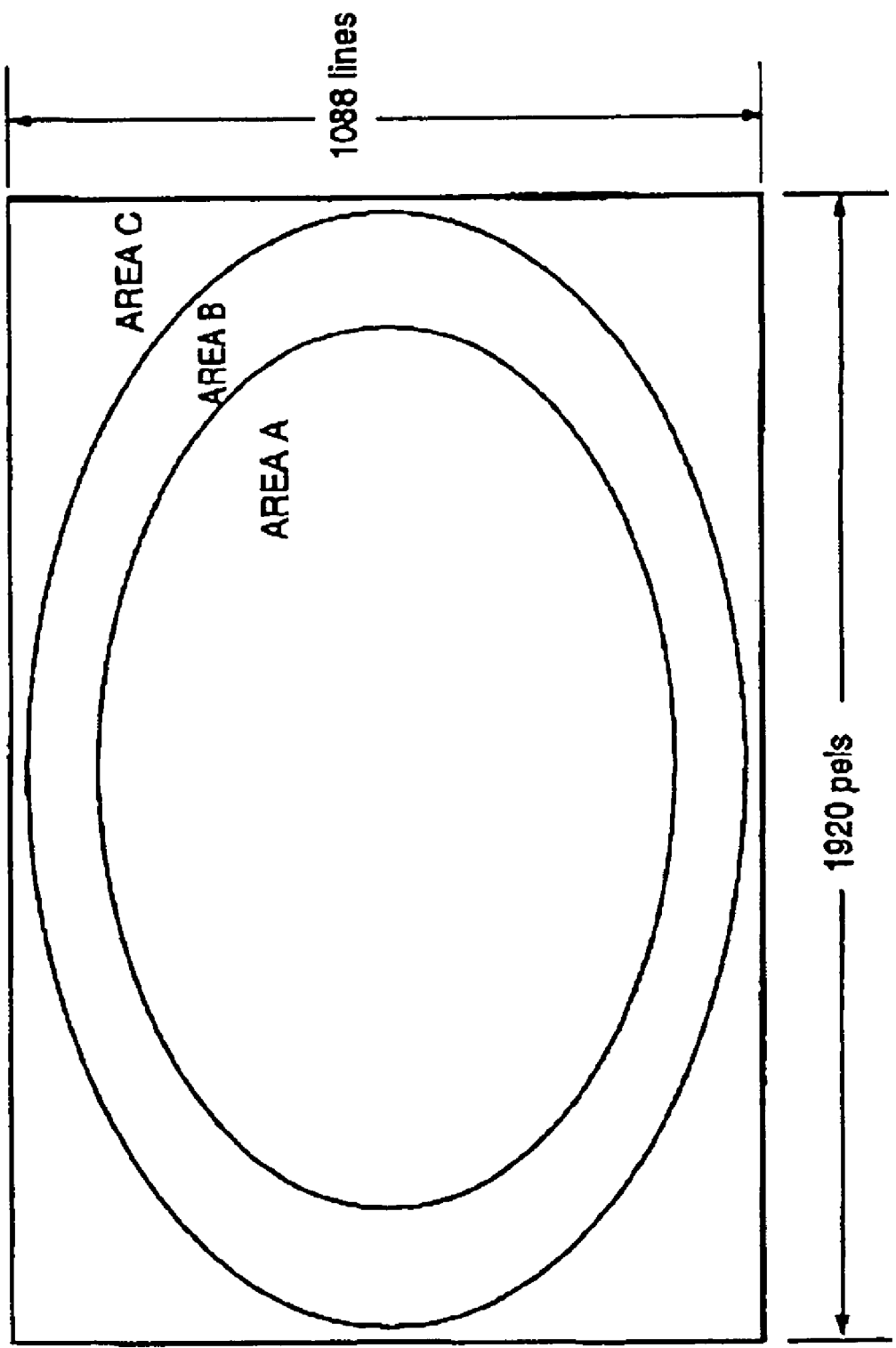
FIG. 7 is used to describe the picture area division process of the area information generator in FIG. 6.

A synchronization signal S108 such as a frame pulse or line pulse synchronized to source picture data S101 is input to area information generator 103, which divides the picture into a plurality of areas. An example of this division is shown in FIG. 7. As shown in FIG. 7, area information generator 103 in this exemplary embodiment divides the picture into a plurality of overlapping concentric circles (ovals) of different radii, specifically three in this embodiment labelled from center out area A, area B, and area C. it will be obvious to one with ordinary skill in the related art that rectangular or square areas can be used instead of circles or ovals.

The reason for thus segmenting the picture is described next. That is, the primary subject is most commonly located in the middle part of pictures taken with a camera, and the viewer'S line of sight (attention) is therefore normally directed to the middle of the picture. This tendency to direct the eyes and attention to the middle can therefore be used to improve coding efficiency by changing the characteristics of prefilter 101 and/or the weighting parameter (coding parameter) of quantization controller 121 in the middle area of primary attention and the surrounding area of less visual importance.

When the characteristics of prefilter 101 are changed, prefilter 101 are weakest (base value fc) in area A located in the middle of the picture. The characteristics of prefilter 101 in area B slightly removed from the middle of the picture are stronger, approximately 1.2 times fc (1.2×fc), in this exemplary embodiment. The characteristics of prefilter 101 in area C most removed from the middle of the picture are strongest, approximately 1.5 times fc (1.5×fc), in this exemplary embodiment.

When the weighting parameter of quantization controller 121 is changed, the weighting parameter is weakest (base value Oc) in area A located in the middle of the picture; approximately 1.2 times Qc (1.2×Qc) in area B slightly removed from the middle of the picture; and approximately 1.5 times Qc (1.5×Qc) in area C most removed from the middle of the picture.

Area information S104 describing the plural elliptical areas of different sizes into which area information generator 103 divided the picture (see FIG. 7) is passed to weight parameter calculator 105 so that this information can be reflected in quantization control. Area information S104 is preferably 3 bits, capable of defining eight types, but shall not be so limited. If source picture data S101 [S1, sic] is divided into areas A, B, and C as shown in FIG. 7, these can be represented in this case in area information S104 with the binary expressions 000 for area A, 001 for area B, and 010 for area C.

Picture analyzer 102 identifies locally visually conspicuous subjects from source picture data S101. More specifically, picture analyzer 102 obtains variance (or) and mean (Pmean) for luminance signal (Pb) and color difference signal (Pr) for a small m×n pel block, compares the resulting variance (or) and mean (Pmean) with the variance and mean values previously obtained from a variety of images to identify the type of a local subject in the picture. variance (or) and mean (Pmean) can be calculated using the following equation.

Equation 1

Figure 8:
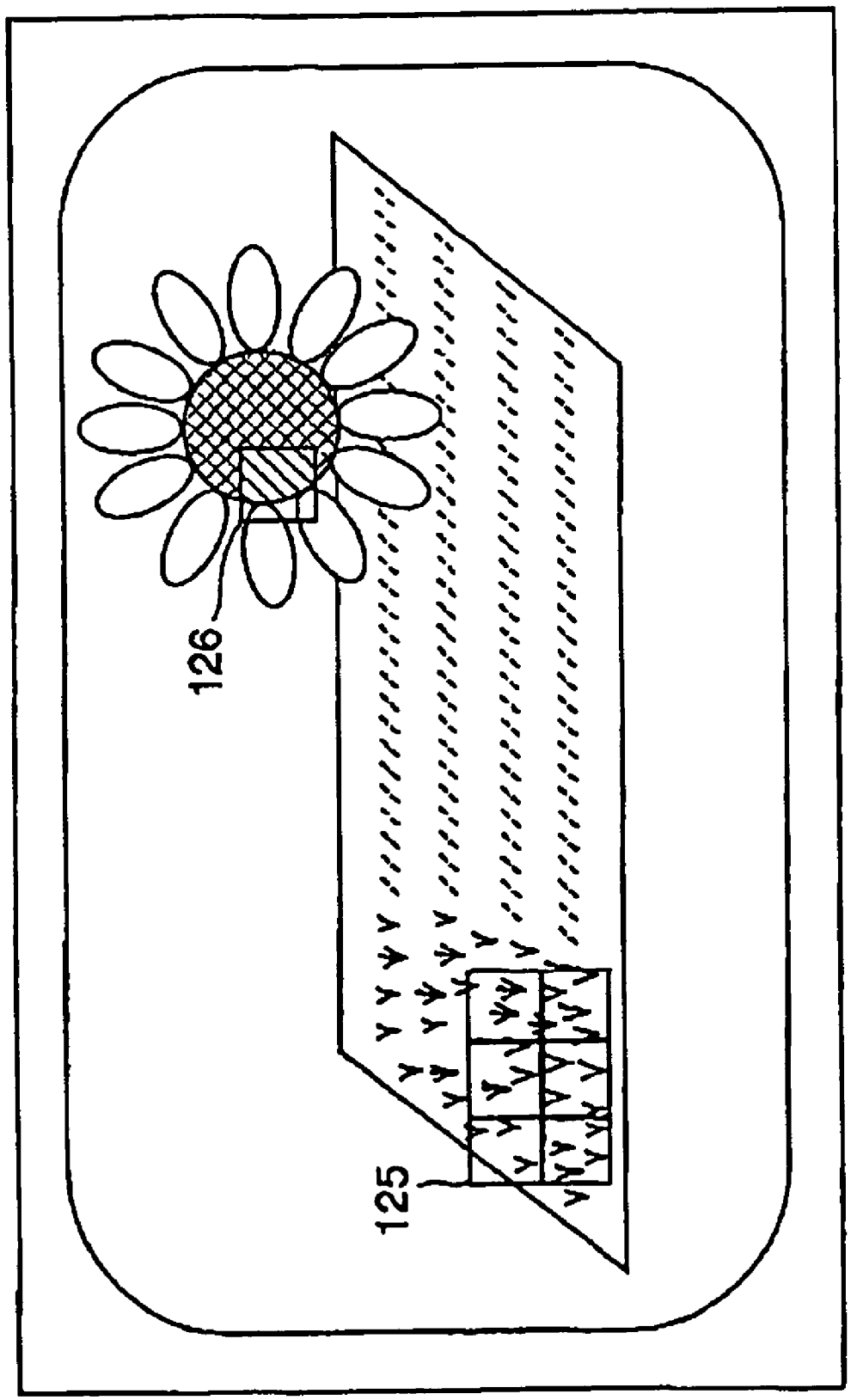
FIG. 8 shows source picture data containing grass and small vegetation.

Referring to FIG. 8, when grass and other small vegetation, for example, is found in small block 125, it can be detected from the relatively high luminance variance and mean color difference that the image in block 125 is green, and the most nearly resembling image is extracted from among a variety of images from which variance and mean values have been obtained. From this extraction it is known that block 125 is a subject that is difficult to encode. Subject information S111 obtained by picture analyzer 102 is applied to weight parameter calculator 105, which calculates a coding parameter based on subject information S111.

Because quantization controller 121 controls the quantization step applied to quantizer 113 using this coding parameter, small block 125 containing an image of grass and small vegetation is quantized using small quantization steps. As a result, even when grass and small vegetation or a similar image is present in only part of the picture, that part of the picture can be quantized with an appropriate quantization step. An encoded image with little flicker and outstanding visual quality can be achieved.

Subject information S106 obtained by picture analyzer 102 is also applied to filter controller 104, which changes the transfer function or filter type of prefilter 101 based on the subject information S106. Because small block 125 containing an image of grass and small vegetation is filtered using optimized filter characteristics, an encoded image with little flicker, and outstanding visual quality can be achieved.

Based on the averages of the luminance signal (Pb) and color difference signal (Pr) obtained by picture analyzer 102, it is also possible to detect small block 126 containing a visually conspicuous subject (such as red) within a certain range of the primary colors, and use this as subject feature information In this case, the mean value/variance value data already detected from the subject by picture analyzer 102, and the same data calculated from source picture data S101, are compared, and the results with the smallest difference are used as the subject information S111 passed to weight parameter calculator 105.

Based on this subject information S111, weight parameter calculator 105 calculates the weighting parameter, and using this encoding parameter quantization controller 121 controls the quantization step applied to quantizer 113. Subjects of any near-prime color, that is, subjects that naturally attract the visual attention of the viewer, are therefore quantized using a small quantization step, and an encoded image with outstanding visual quality can be achieved.

Figure 9:
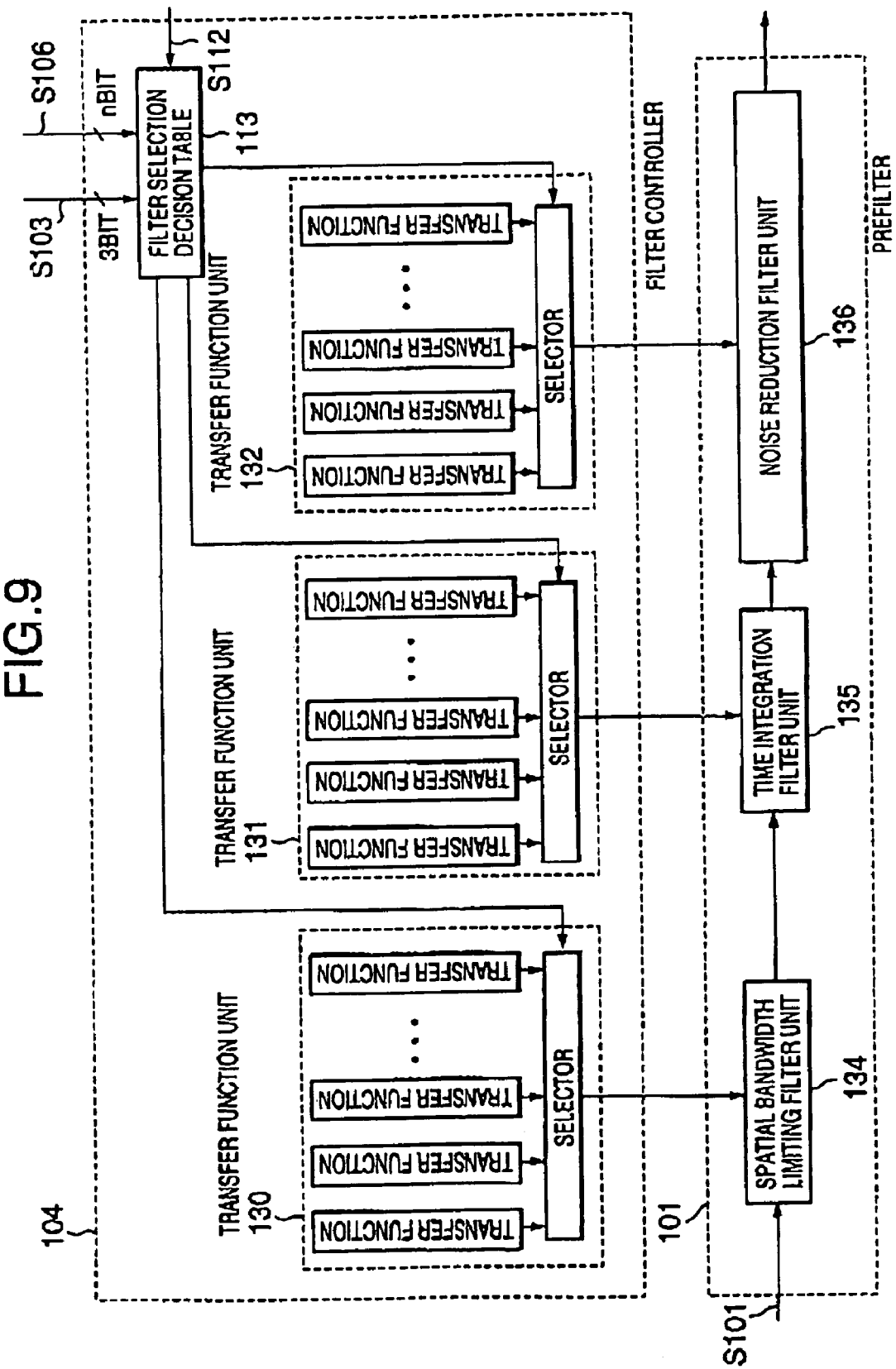
FIG. 9 is a block diagram of the filter controller and prefilter shown in FIG. 6.

The filter controller 104 and prefilter 101 are described next below with reference to FIG. 9. Shown in FIG. 9 are a transfer function unit 130 to 132 for each filter; a filter selection decision table 133 [NOTE: SHOWN AS 113 IN FIG. 9]; a spatial bandwidth limiting filter unit 134 for limiting the spatial frequency band; a time integration filter unit 135; and a noise reduction filter unit 136 for accomplishing a median filter process and isolated point elimination.

Based on area information S103 and quantization step accumulator 106 input thereto, filter selection decision table 133 controls the transfer function unit 130, 131, and 132 for each filter unit 134, 135, and 136. Each transfer function unit 130, 131, and 132 has a selector for selecting a desired transfer function from among a plurality of transfer functions (a parameter determining filter strength). Each filter unit 134, 135, and 136 adjusts the filter characteristics based on the transfer function applied from each transfer function unit 130, 131, and 132. It should be noted that the transfer functions include pass-through.

As noted above, the middle of the picture is typically the area of greatest visual concentration. Control of filter unit 134, 135, and 136 is therefore weakest in area A at the middle of the picture, and gradually stronger in area B and area C. For example, bandwidth limiting of spatial bandwidth limiting filter unit 134 is set to either through-pass or weakly filter in area A, and apply successively stronger bandwidth limitation in area B and then area C. It should be noted that noise reduction filter unit 136 can be similarly controlled, but if optimal noise reduction can be achieved, then it can be uniformly controlled in each area.

Furthermore, filter selection decision table 133 adaptively controls the transfer function selectors according to the amount of code generated, as detected in code size information S112 from buffer 115, relative to subject information S106 identified by picture analyzer 102. Basically, if the amount of code generated per picture is less than the average, filtration is loosened, and if the code size is greater than the average, filtration is strengthened. Filter unit 134, 135, and 136 can also be controlled in combination with the above-noted area information S103.

Prefilter 101 contains three types of filters: spatial filter unit 134, time integration filter unit 135, and noise reduction filter unit 136. A specific transfer function (a parameter determining filter strength) is discretely applied to each filter unit, and the transfer functions are individually controlled by filter selection decision table 133. It should be noted that the transfer functions include pass-through. Because filter controller 104 adaptively controls changing the filter characteristics in visually conspicuous areas and areas that are not so conspicuous, effective filtering, such as bandwidth limiting, can be achieved, and coding efficiency can be improved.

Operation of weight parameter calculator 105 is described next. Inputs to weight parameter calculator 105 include area information S104 from area information generator 103, subject information S111 as analyzed by picture analyzer 102, and difference data S107 from subtractor 111. The quantization controller 121 controls the quantization step based on code size information S112 from buffer 115 and activity (not shown in FIG. 6) detected in the coding image. While the amount of code generated decreases as the quantization step gets larger, degradation in the decoded image (that is, block distortion) also increases and is visually undesirable.

Conventional activity control changes the quantization step by the quantization controller 121 knowing the detail level in local picture areas so that image deterioration is prevented from becoming visible. However, when the overall level of activity in the picture is high, the quantization step is uniformly controlled for the entire picture, and the net result is an increase in image deterioration.

However, by identifying subject type and visually important picture areas, a picture coding apparatus according to this preferred embodiment of the invention converts this information to a quantization step coefficient, and weight parameter calculator 105 calculates a weighting coefficient S113 applied to quantization controller 121. As a result, the quantization step is controlled separately in each area based on the subject type and visually important picture areas, and an encoded picture with visually outstanding image quality can be achieved.

It should be noted that it is also effective to apply the difference data S107 to be actually coded as a reference parameter to weight parameter calculator 105 in addition to area information S104 and subject information S111. By multiplying weighting coefficient S113 with the normal quantization step, quantization control can be effectively applied in both visual and coding efficiency terms.

Furthermore, while visual area information S104 and subject information S111 detected by picture analysis are used by weight parameter calculator 105 to control the quantization step of encoder 110, using this information shall not be limited to controlling the quantization step. An encoded picture with visually outstanding image quality can also be achieved by applying this information to the in-loop filter transfer function and multiplying the DCT converter 112 coefficient with the high frequency component.

Figure 10:
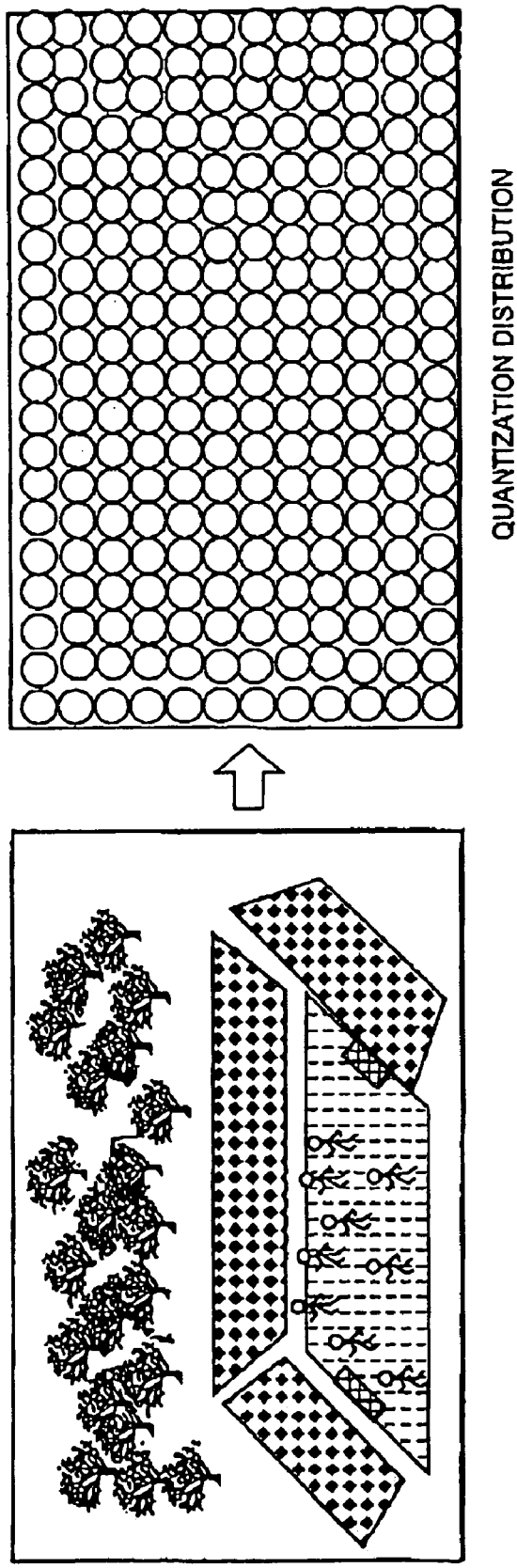
FIG. 10 shows the quantization step distribution information accumulated by the quantization step accumulator in FIG. 6.

A process for adaptively shifting the areas separated by area information generator 103 is described next. Inputs to area information generator 103 include feature data S102 detected by picture analyzer 102, and quantization step distribution information S109 gathered by quantization step accumulator 106. Feature data S102 is expressed by the distribution of local subject detail levels (variance and activity, for example) in the picture. As shown in FIG. 10, quantization step distribution S109 is obtained by quantization step accumulator 106 obtaining for each frame the quantization step S110 for each macroblock output by quantization controller 121.

Figure 11:
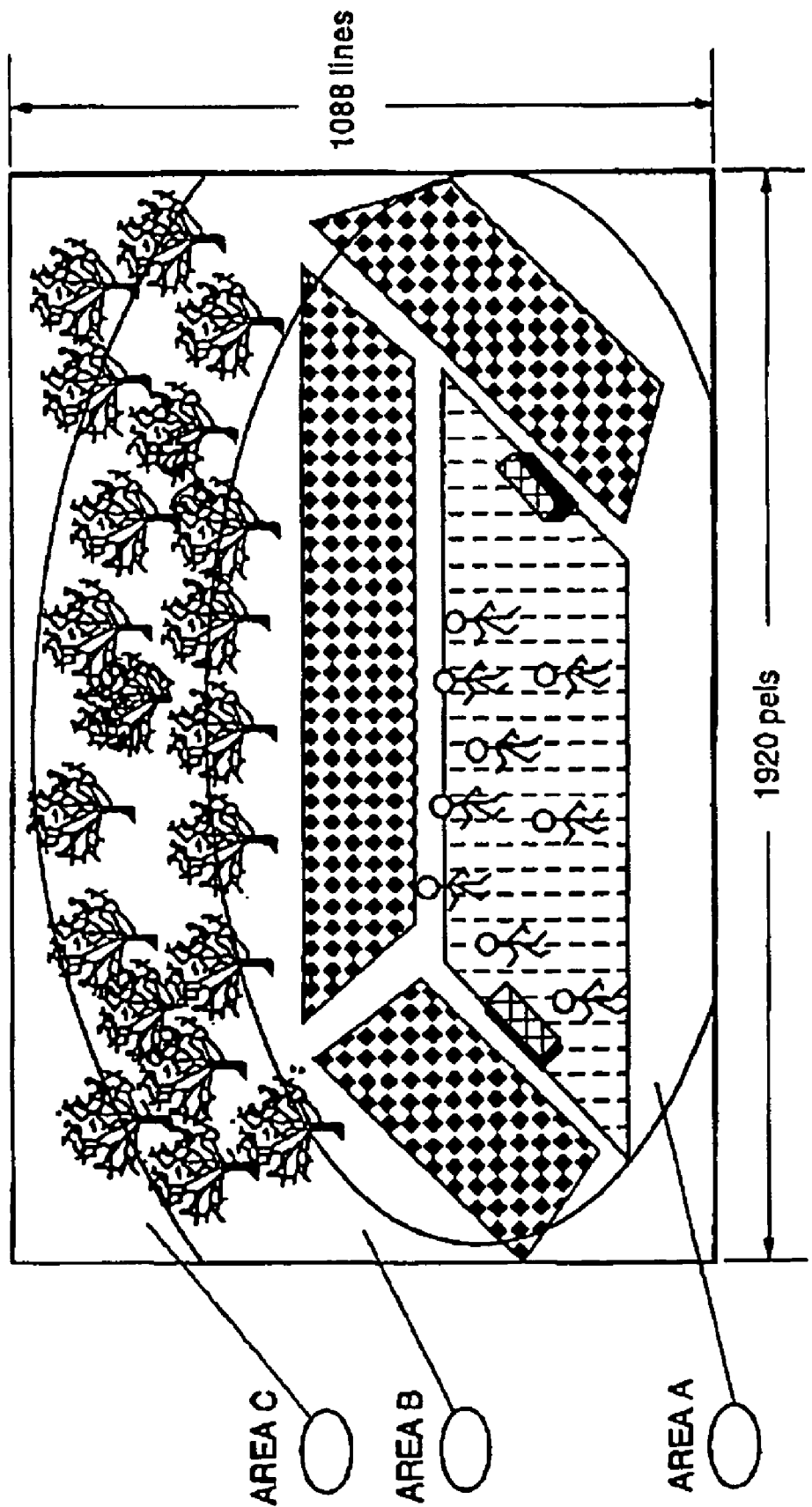
FIG. 11 describes shifting picture area extraction by the area information generator in FIG. 6.

Furthermore, while the most visually important area is typically in the middle of the picture as described above, the most visually significant subject matter is not in the middle in all pictures. For example, in the picture shown in FIG. 11, the eyes are naturally attracted to and normally concentrate on the lower half of the picture. Therefore, if the area information generator 103 also references feature data S102 obtained by analyzing the source picture, and quantization step distribution S109 determined for actual encoding, the area information generator 103 can shift the areas into which the picture is segmented horizontally or vertically, and thereby correct the center of the segmented areas to match the areas of visual importance. As a result, an encoded picture with visually outstanding image quality can be achieved.

Embodiment 3

Figure 12:
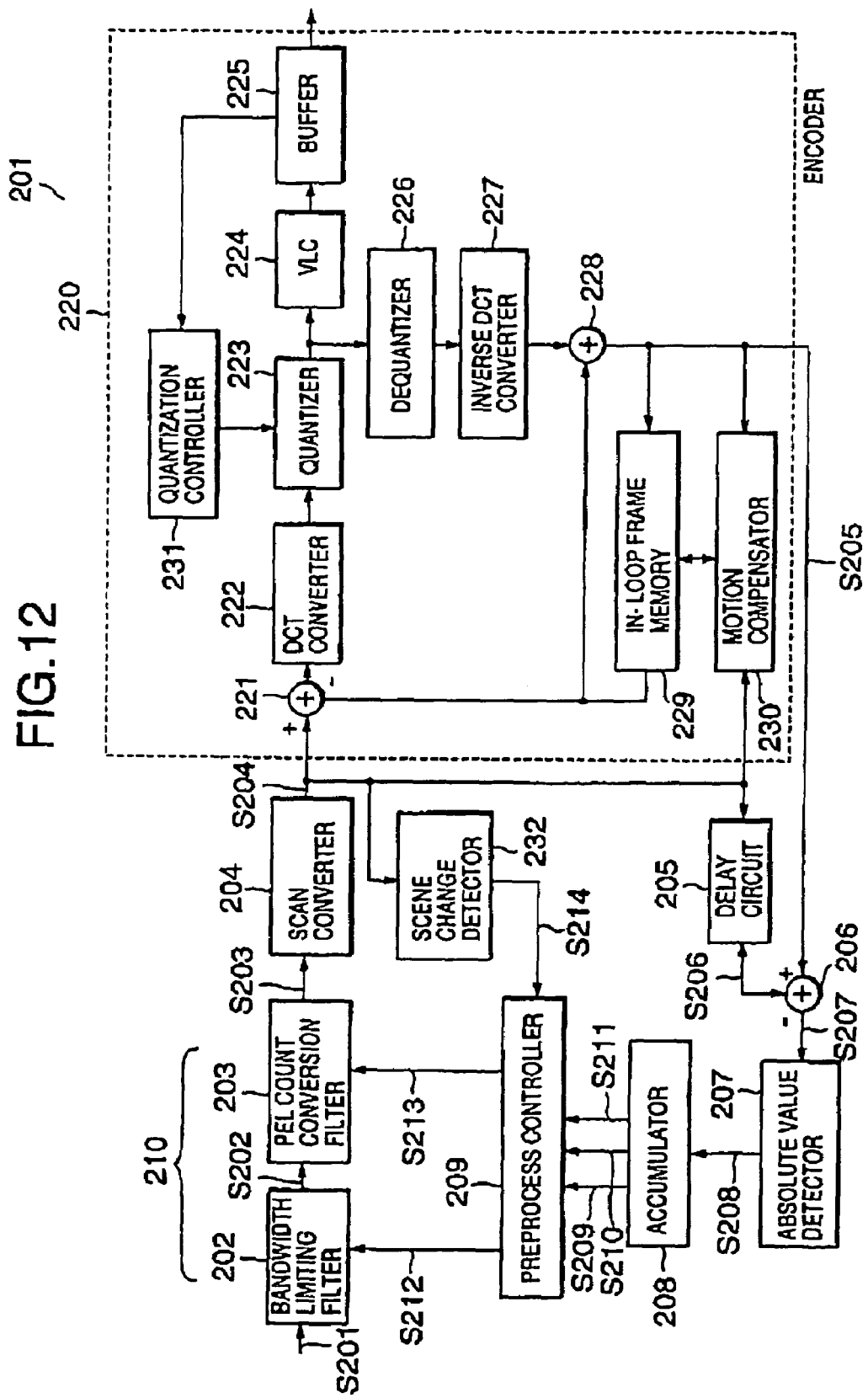
FIG. 12 is a block diagram of a picture coding apparatus according to a third preferred embodiment of the invention.

FIG. 12 is a block diagram of a picture coding apparatus 201 according to a third preferred embodiment of the present invention.

Shown in FIG. 12 are variable operating characteristics bandwidth limiting filter 202 (bandwidth limiter) for limiting the frequency band of source picture data S201 input thereto; pel count conversion filter 203 (pel count converter) for changing the horizontal pel count and line count of the source picture data S202 input thereto from bandwidth limiting filter 202; scan converter 204 for converting the picture data S203 output from pel count conversion filter 203 from raster scan to block scan data; and encoder 220 for coding the picture data S204 input thereto from scan converter 204.

Note that the bandwidth limiting filter 202 and the pel count conversion filter 203 collectively form a picture preprocessor 210 which preprocesses the source picture data S201.

Delay circuit 205 matches the pel positions of each frame S0 that the difference between locally decoded data S205 output from encoder 220 and source picture data S204. Difference operator (eubtractor) 206 obtains the distortion between source picture data S204 and locally decoded data S205. Absolute value detector 207 detects the absolute value of difference data S207, and accumulator 208 adds the absolute difference value data S208 for a desired pel unit (block). Preprocess controller 209 controls the filtering characteristics of bandwidth limiting filter 202 and the decimation rate of pel count conversion filter 203 based on accumulator outputs S209 to S211.

Subtractor 221 obtains the difference between the applied source picture data S204 and a previous encoded and decoded picture data. DCT converter 222 (orthogonal converter) converts the difference data from subtracter 221 to frequency domain information. Quantizer 223 then quantizes the orthogonally converted data from DCT converter 222. VLC 224 removes redundancy from the quantized data, and buffer 225 to the transmission path.

Dequantizer 226 dequantizes the data quantized by quantizer 223. Inverse DCT converter 227 then inverse DCT converts the dequantized data from dequantizer 226, and adder 228 adds the data from inverse DCT converter 227 with the decoded data from n frames back, and outputs locally decoded data S205.

In-loop frame memory 229 stores the locally decoded data S205 added by adder 228. Motion compensator 230 controls reading from in-loop frame memory 229 by means of a motion vector, which is obtained by detecting the change in the picture based on source picture data S204 and locally decoded data S205. Quantization controller 231 controls the quantization step, and thus determines the bit rate and encoding picture quality. Scene change detector 232 detects scene changes based on the correlation between temporally adjacent frames in the picture data S204 input thereto.

Operation of this picture coding apparatus is described next.

Basic overall operation is described first with reference to FIG. 12. Source picture data S201 is a component signal comprising a luminance signal and color difference signals (Pb, Pr or Cb, Cr). This source picture data S201 is input to bandwidth limiting filter 202 and pel count conversion filter 203 for preprocessing, specifically bandwidth limiting and pel count conversion. An HDTV signal, for example, has a 30 MHz frequency band and 1920 horizontal pel count. This preprocessing operation limits the bandwidth to 25 MHz or 20 MHz, for example, and decimates the horizontal pel count to 1440 or 1280 pels. It will also be obvious that the bandwidth could be limited while retaining the original 1920 pel count.

The preprocessed source picture data S203 is then input to scan converter 204 whereby it is converted from screen sequence scanning (raster scan data) to block scan data (that is, scanning within the plural smaller blocks of plural pels into which each picture is converted). In MPEG-2, DCT is applied to 8×8 blocks, and quantization and motion compensation to 16×16 macroblocks. In this preferred embodiment of the invention scan converter 204 is downstream of preprocessor 210, but scan converter 204 can be alternatively upstream of preprocessor 210 because bandwidth limiting and pel count conversion can occur after scan conversion.

The source picture data S204 from scan converter 204 is input to delay circuit 205 whereby source picture data S204 is delayed so that the difference between the same pels in a particular frame can be detected. The source picture data S204 from scan converter 204 is also input to encoder 220.

In the encoder 220, source picture data S204 is first input to subtractor 221 whereby the difference between source picture data S204 and the picture data stored to in-loop frame memory 229 is obtained. This difference data is input to DCT converter 222 and converted to frequency domain data. The frequency domain data is passed to quantizer 223 whereby it is quantized. Redundancy is removed from the quantized data by VLC 224, and the resulting data is then smoothed and output to the transmission path at a constant bit rate by buffer 225.

Quantizer 223 also passes the quantized data to dequantizer 226 for dequantization. The dequantized data is then inverse DCT converted by inverse DCT converter 227, and the result is added by adder 228 to the coded data from n frames before. The locally decoded data S205 output from adder 228 is input to in-loop frame memory 229, motion compensator 230, and difference operator 206.

The motion compensator 230 controls reading from inloop frame memory 229 based on the locally decoded data S205 input from adder 228 and the source picture data S204 input from scan converter 204.

Difference operator 206 obtains the difference between locally decoded data S205 input thereto and delayed data S206 output from delay circuit 205. This difference is the guantization error occurring when the data was quantized by encoder 220. Quantization error decreases as the guantization step gets smaller, and increases as the step gets bigger, but this also depends on subject movement and pattern detail. For example, if the subject is a moving picture, a high frequency component signal is produced when the interframe difference obtained by subtractor 221 is converted to frequency domain data by the DCT converter 222.

When this high frequency component signal is quantized with a large quantization step, the original difference cannot be reproduced. This appears as distortion of the source picture data S204, and is a visually undesirable defect. However, the interframe difference obtained by subtractor 221 for a plain pattern is small, and high frequency component signals do not typically occur. Quantization error is therefore not particularly great even with coarse quantization.

Figure 13:
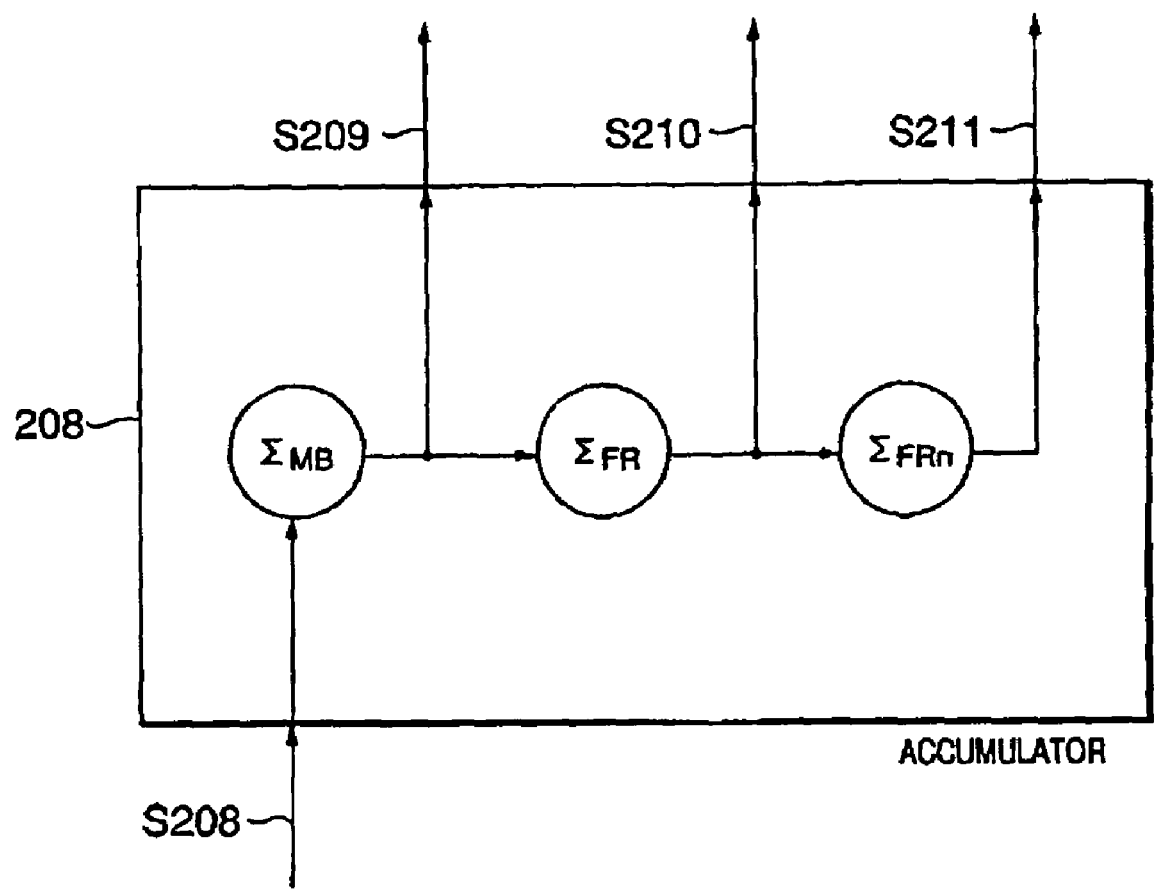
FIG. 13 is a block diagram of the accumulator shown in FIG. 12.

Absolute value detector 207 obtains the absolute value of difference data S207 output from difference operator 206, and thus obtains absolute difference value data S208. As shown in FIG. 13, absolute difference value data S208 is input to accumulator 208, which accumulates macroblock sum S209 for each of a desired number of macroblocks in the frame, frame sum S210 accumulating absolute values for the frame, and plural frame sum S211 accumulating absolute values for a plurality of frames. The preprocess controller 209 uses these accumulator outputs S209 to S211 to control bandwidth limiting filter 202 and pel count conversion filter 203.

Figure 14:
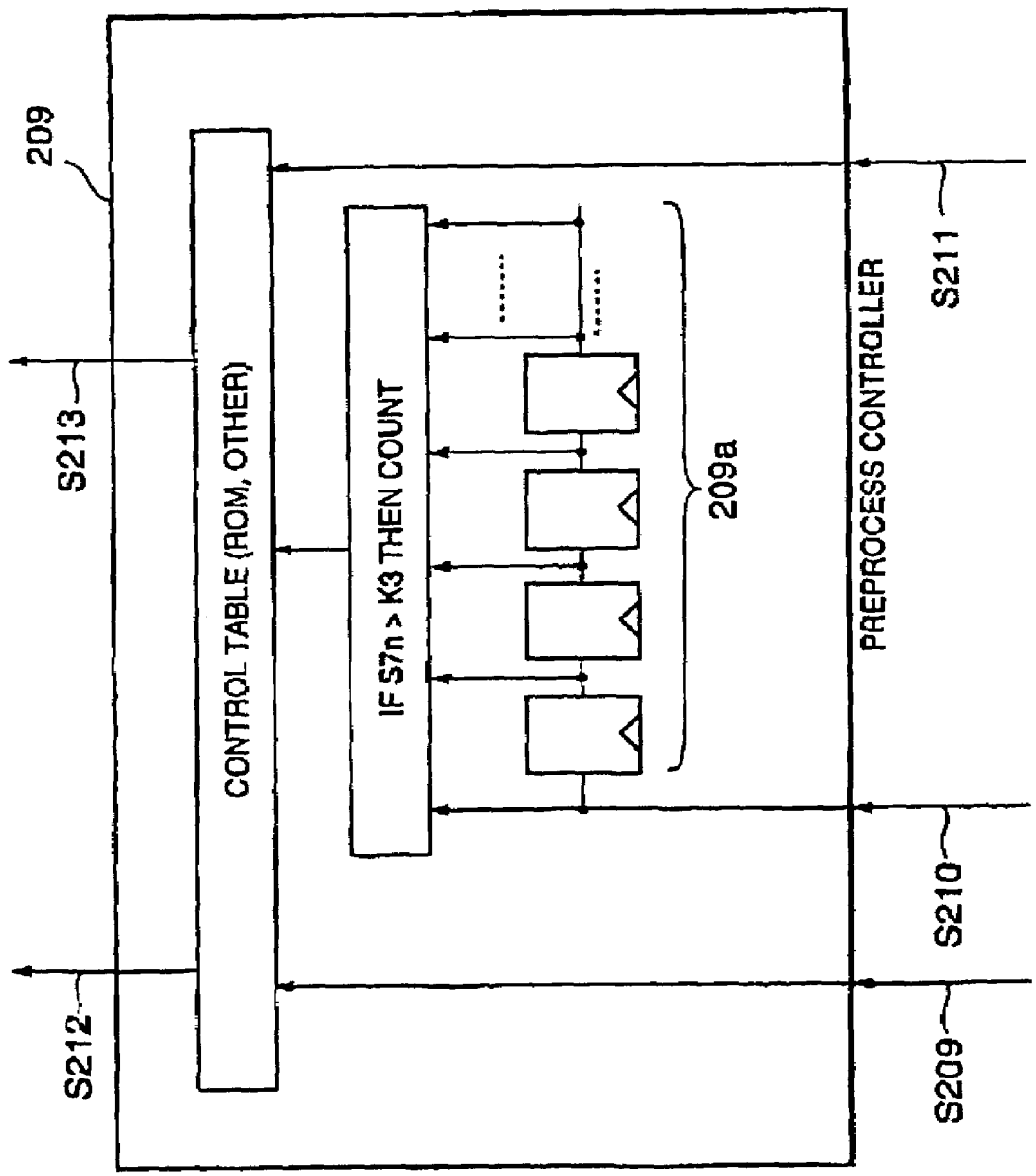
FIG. 14 is a block diagram of the preprocess controller shown in FIG. 12.

Operation of preprocess controller 209 is described next below with reference to FIG. 14.

As noted above, accumulator outputs S209 to S211 produced by accumulator 208 are plural signals resulting from accumulating the input absolute values for each of some desirable number of macroblocks in one frame, for each frame, and for each group of some plurality of frames. These accumulated results S209 to S211 are input to preprocess controller 209. Using macroblock sum S209 for a plurality of macroblocks or other plural pel unit, preprocess controller 209 changes the characteristics of bandwidth limiting filter 202 to narrow the frequency band if it determines that coding is difficult because macroblock sum S209 is greater than a specified threshold value K1.

Conversely, if macroblock sum S209 is less than specified threshold value K1, preprocess controller 209 changes the characteristics of bandwidth limiting filter 202 to broaden the frequency band (including to allow signal pass through). It is therefore possible to prevent the quantization step from becoming too coarse even when the bit rate is low, and an encoded picture with visually outstanding image quality in which block distortion is not conspicuous can be achieved.

While the type of bandwidth limiting filter 202 is not specifically limited, a FIR filter with little aliasing noise is generally preferable. The unit for changing bandwidth limiting filter 202 characteristics can also be each frame or some local area within the frame. When filtering is applied to some local picture area, macroblock sum S209 is sequentially stored to memory 209a of preprocess controller 209, the quantization error distribution within the picture is obtained, and filter characteristics can be changed at a desired unit according to the size of the quantization error. Furthermore, if the distribution of quantization error is dispersed throughout the picture, and frame sum S210 is greater than a specific threshold value K2, the filter is applied to the entire picture.

Pel count conversion filter 203 can decimate the horizontal pel count conversion of an HDTV source signal according to U.S. and Japanese digital broadcasting standards (see ARIB STD-B20, for example) from 1920 pels (120 macroblocks) to 1440 pels (90 macroblocks) for transmission. The smallest unit at which this pel count can change is the frame (or field), and only in intraframe coded pictures (that is, I-pictures). Decimating the pel count to 1440 pels not only narrows the bandwidth and reduces the macroblock count, it in also an effective means of coding pictures at a low bit rate and coding pictures that are difficult to encode.

To effectively change the pel count (format) under these standards, frame sum S210 accumulating absolute value data by frame, and plural frame sun S211 accumulating the data for a group of plural frames, are used. Coding is determined to be difficult when sums S210 and S211 are greater than a specific threshold value K3, and the next I-picture is therefore decimated to 1440 pels. Conversely, when sums S210 and S211 are less than a specific threshold value K3, data is passed through without pel decimation. It is therefore possible to prevent the quantization step from becoming coarser than necessary, even when the bit rate is low, and an encoded picture with visually outstanding image quality in which block distortion is not conspicuous can be achieved.

It will be obvious to one with ordinary skill in the related art that while decimating a 1920 pel count in an HDTV signal to 1440 pels is described above, the invention shall not be limited to these two pel counts. For example, the characteristics of pel count conversion filter 203 can be changed so that the pel count is decimated to 1280 pels in order to further increase the compression rate.

Frame sum S210 accumulating absolute value data by frame, and plural frame sum S211 accumulating the data for a group of plural frames, can also be separately applied. For example. When all frames are I-pictures (intraframe predictive-coded pictures), the pel count can be changed frame by frame, and it is therefore possible to use only frame sum S210. On the other hand, when inter-frame predictive-coding is used and the interval between I-pictures is longer, plural frame sum S211 accumulating values for the past plural frames until immediately before I-picture coding can be used for control.

It is also possible to store frame sum S210 to memory 209a to accumulate a frame hysteresis, and decide the pel count from the next r-picture based on the number of frames for which frame sum S210 exceeds threshold value K3 in the plural frames from the last I-picture to immediately before the next I-picture. This has the effect of imparting hysteresis to cases in which the pel count changes on a frame unit, and has the effect of preventing screen flashing due to frequent pel count changes.

Figure 15:
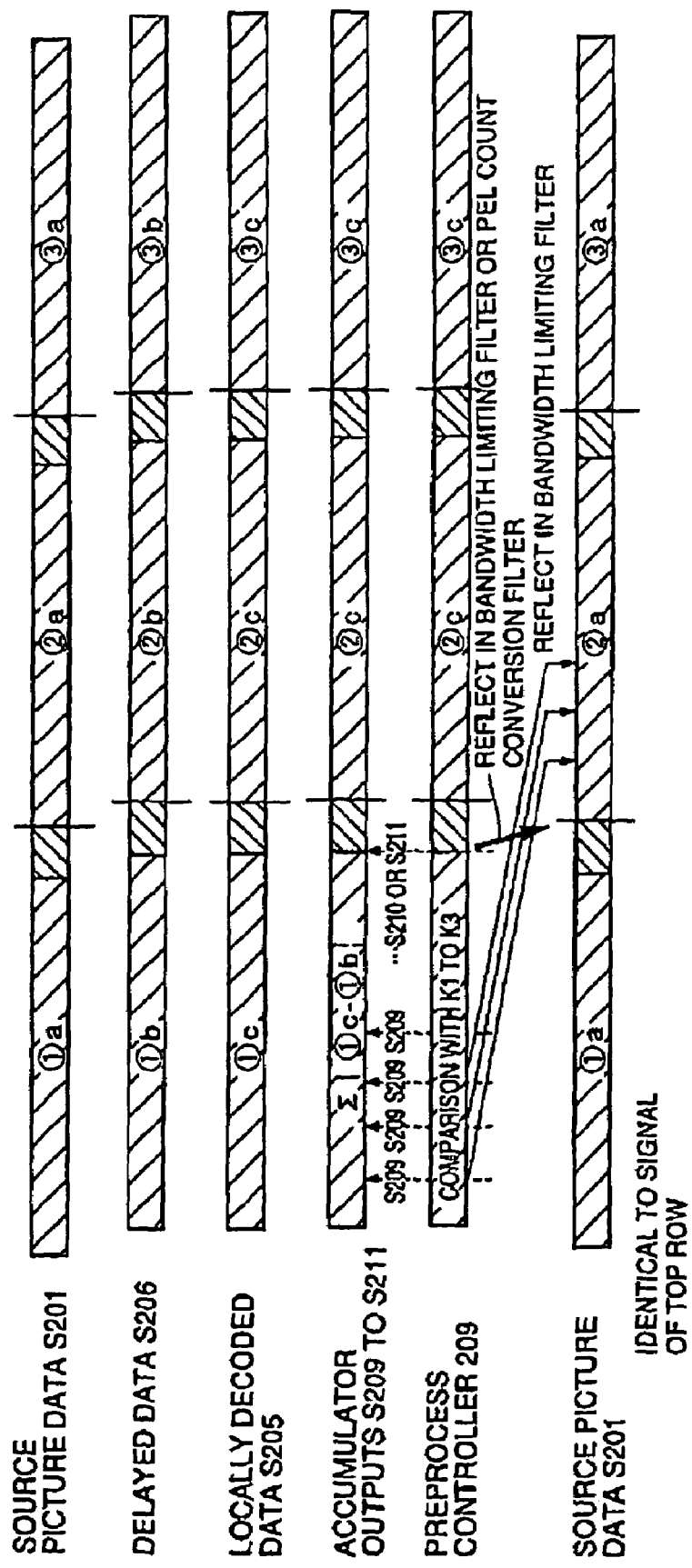
FIG. 15 shows the operating and control timing.
Figure 16:
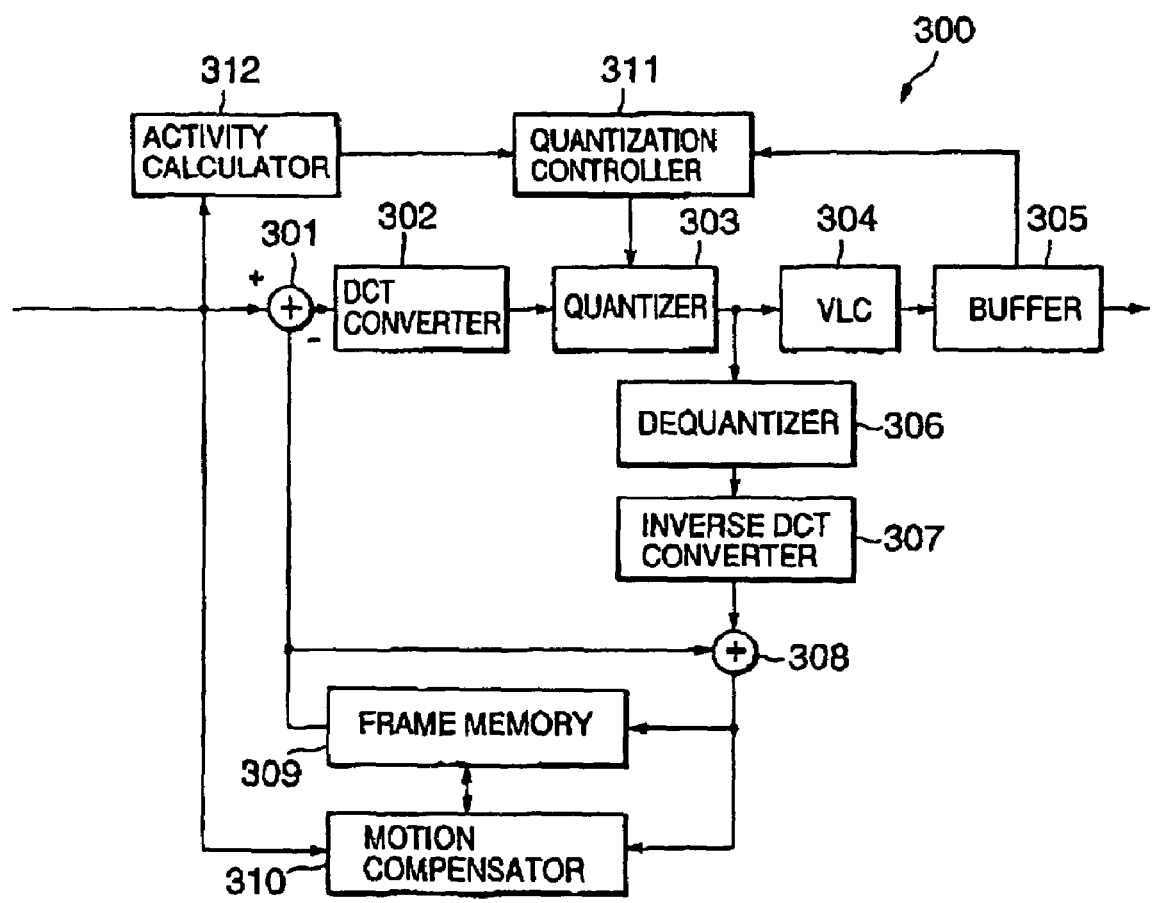
FIG. 16 is a block diagram of a picture coding apparatus according to the related art.
Figure 17:
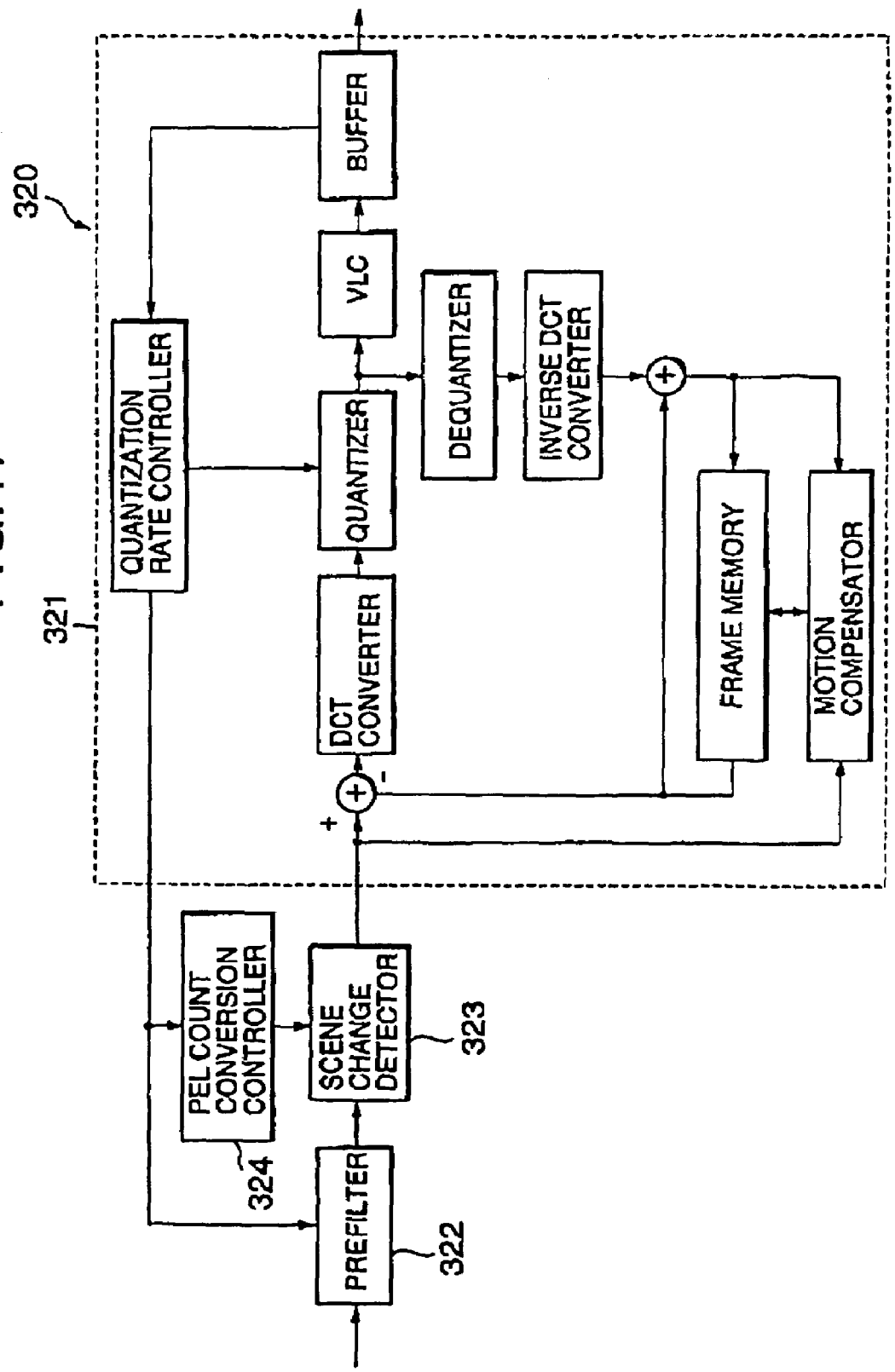
FIG. 17 is a block diagram of a picture coding apparatus according to the related art.
Figure 18:
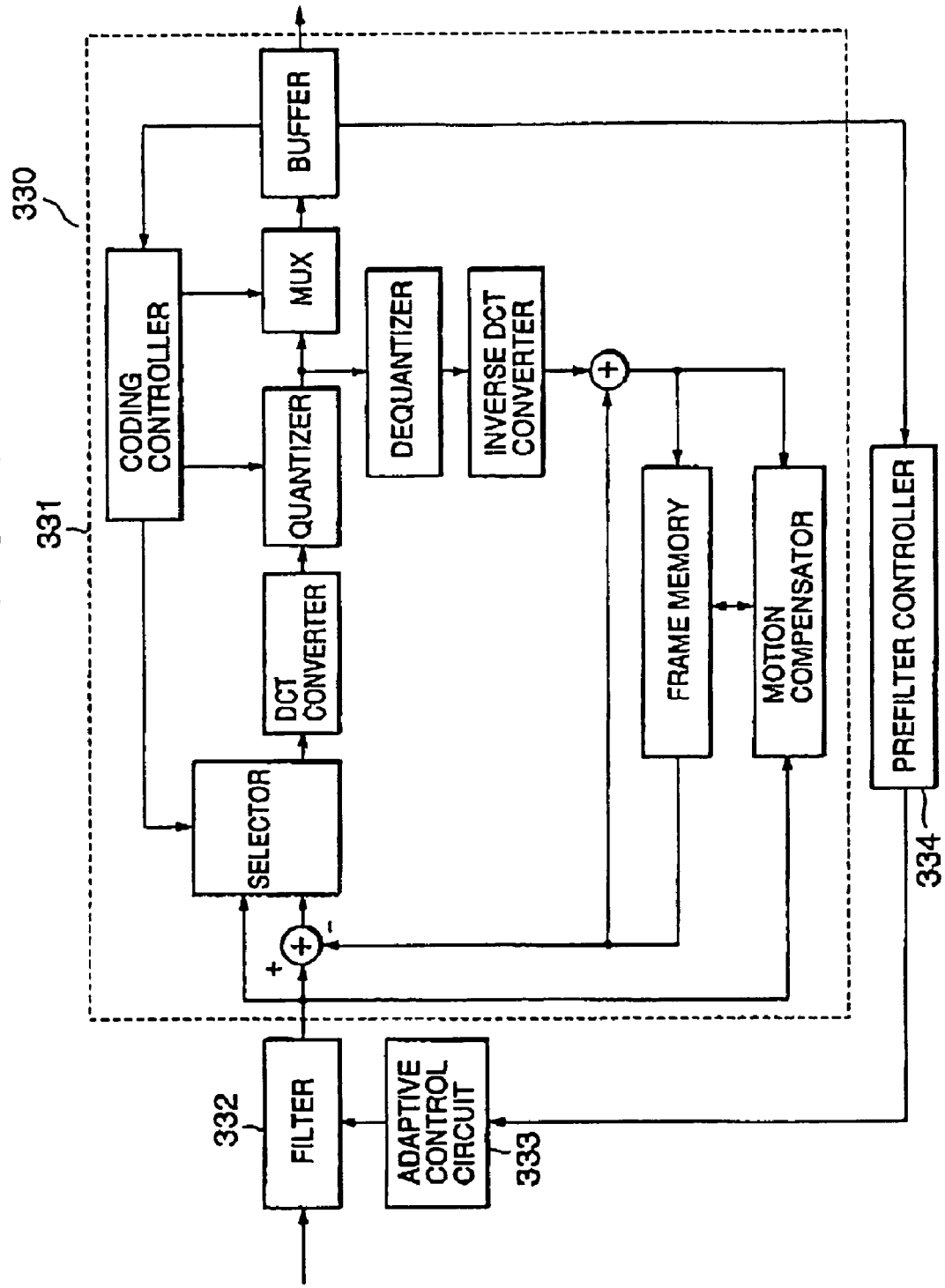
FIG. 18 is a block diagram of a picture coding apparatus according to the related art.
Figure 19:
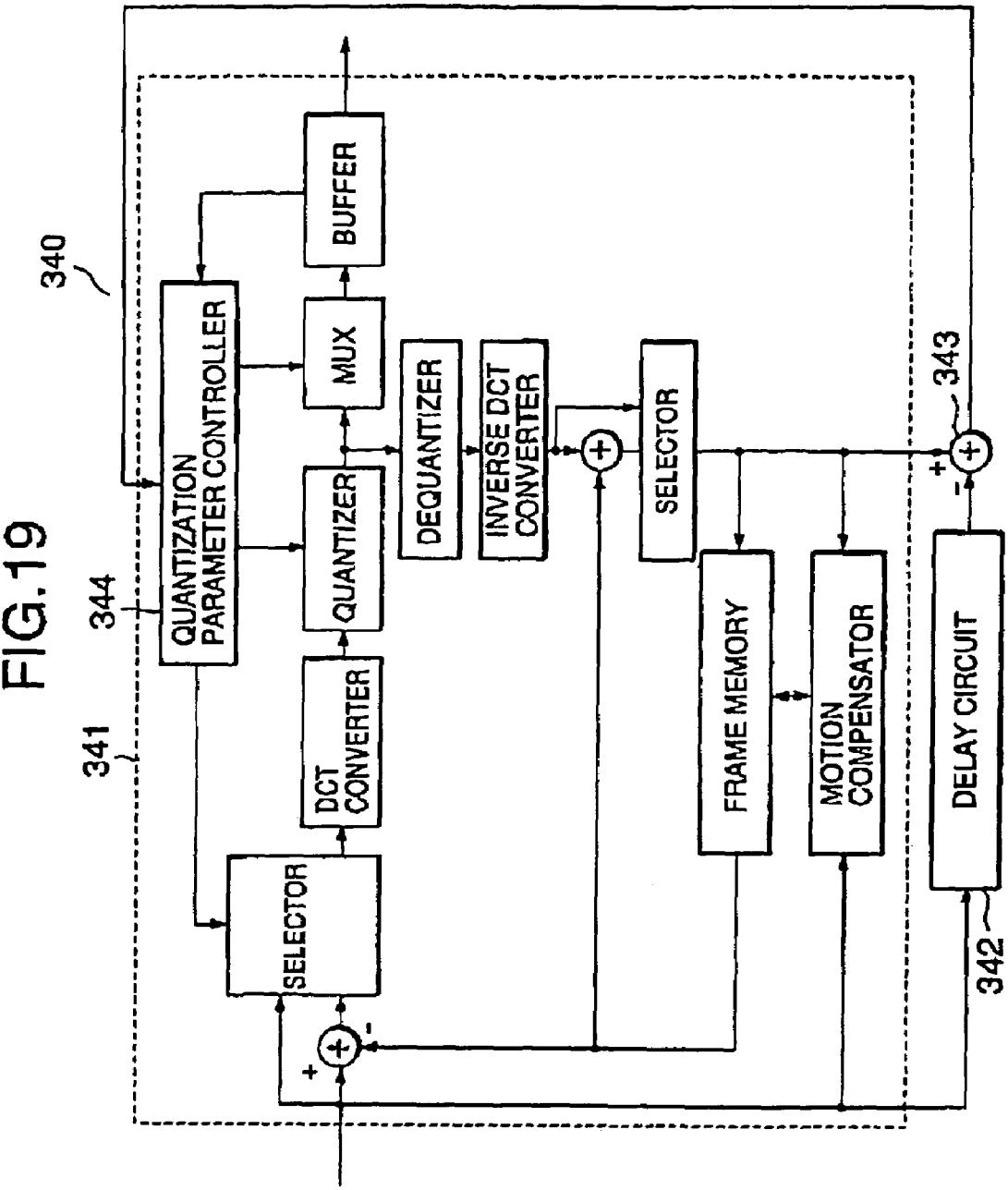
FIG. 19 is a block diagram of a picture coding apparatus according to the related art.

Furthermore, because picture coding apparatus 201 accumulates values by frames using locally decoded data S205 output from encoder 220, control of preprocessor 210 by means of accumulator outputs S209 to S211 is reflected not in the current frame but in the next frame as shown in FIG. 15 Therefore, when a scene change occurs in a frame in which this control should be reflected, this process will be meaningless if preprocessor 210 is control based on difference distortion data for the previous frame.

Therefore, source picture data S204 is also input to scene change detector 232 to detect whether a scene change occurred between frames in source picture data S204. More specifically, scene change detector 232 detects the correlation between temporally adjacent frames in source picture data S204. If the correlation is less than a specific threshold value, scene change detector 232 decides that the scene changed. If a scene change occurs, scene change detector 232 outputs a scene change detection signal S214 to preprocess controller 209, and preprocess controller 209 interrupts control of preprocessor 210 for one frame. Preprocessor 210 is thus prevented from applying a process inappropriate to the characteristics of source picture data S201, and an encoded picture with visually outstanding image quality can be achieved.

It will be obvious to one with ordinary skill in the related art that the smallest unit used for the accumulation process of accumulator 208 is the macroblock only because source picture data S204 and locally decoded data S205 are both block scan data, and some other pel unit can be alternatively used. In this case, however, scan conversion must be applied to source picture data S204 or difference data S207.

Furthermore, preprocessor 210 in this exemplary embodiment has bandwidth limiting filter 202 and pel count conversion filter 203, but can be alternatively comprised with a selector, for example, to switch the output of bandwidth limiting filter 202 and pel count conversion filter 203. In this case, preprocess controller 209 also controls this selector based on accumulator outputs S209 to S211.

Effects of the Invention

Comprised as thus described above, a picture coding apparatus and picture coding method according to the present invention achieve the following effects.

That is, a picture coding apparatus according to the present invention controls the picture converter so that the conversion controller selects spatial conversion, temporal conversion, or both. The picture converter can therefore convert the image format of the source picture data using either one of spatial conversion and temporal conversion, and the compression rate can be increased without producing visually conspicuous block distortion, particularly when coding and transmitting at a low bit rate.

Furthermore, the picture coding apparatus of our invention divides the screen area of the source picture data into a plurality of areas, and changes the filter characteristics or quantization step according to the picture area. Visual image degradation is therefore difficult to perceive and the code size can be effectively lowered. our picture coding apparatus can therefore transmit a high image quality picture at a low rate.

Moreover, the picture coding apparatus of the present invention indirectly determines the coding difficulty of a picture using the source picture data and locally decoded data obtained by locally decoding the coded source picture data, and the preprocess controller uses this coding difficulty information to control the preprocessor. The picture coding apparatus of our invention can thus prevent the quantization step from becoming coarser than necessary even when the bit rate is low, and produces encoded pictures with visually outstanding image quality in which block distortion is not conspicuous.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A picture coding apparatus, comprising:
   a picture analyzing unit for analyzing source picture data to obtain coding difficulty information;
   a picture conversion unit for temporally converting a picture format of the source picture data to reduce temporally-redundant information, the picture conversion unit including:
   a bandwidth filter;
   a pel count converter;

a frame/field decimation unit that decimates redundant frames and fields;

a scan converter that converts the image signal received from the frame/field decimation unit to block scan data; and a preprocess controller that controls the frame/field decimation unit, pel count converter and scan converter based on the coding difficulty information;

a coding unit for encoding picture data converted by the picture conversion unit; and a conversion controller for controlling the picture conversion unit based on the coding difficulty information to convert the picture format using at least temporal conversion.

2. A picture coding apparatus as described in claim 1, wherein the coding difficulty information is information about the source picture data, including at least one of: spatial frequency component information, noise component information, interframe change information, and interframe motion vector information.

3. A picture coding apparatus as described in claim 1 or 2, wherein the coding unit encodes picture data based on conversion information input thereto by the picture conversion unit, and multiplexes the conversion information to the picture data.

4. A picture coding apparatus as described in any of claims 1 to 2, wherein the picture analyzing unit analyzes the source picture data using a specific threshold value.

5. A picture coding apparatus as described in claim 4, wherein the picture analyzing unit determines the threshold value based on a coding result from the coding unit.

6. The apparatus of claim 1, wherein said temporal conversion being performed using at least a frame/field decimator eliminating redundant frame(s) and/or field(s).

7. The apparatus of claim 1, wherein said coding unit to encode the picture data based on conversion information being input by said conversion controller.

8. The apparatus of claim 1, wherein said conversion controller to convert the picture format using both said temporal conversion and spatial conversion.

9. The method of claim 8, further comprising controlling the encoding based on conversion information determined from said converting.

10. A picture conversion method for use with a picture coding method for coding source picture data after picture conversion, comprising:

temporally converting a picture data format based on coding difficulty information using at least temporal conversion to reduce temporally-redundant information by filtering the picture data through a bandwidth filter;

processing the filtered picture data through a pel count converter;

decimating redundant frames and fields of the picture data through a frame/field decimation unit;

converting the decimated picture data to block scan data by a scan converter; and controlling the frame/field decimation unit, pel count converter, and scan converter based on the coding difficulty information by a preprocess controller.

11. A picture coding method as described in claim 10, wherein the coding difficulty information is information about the source picture data, including at least one of: spatial frequency component information, noise component information, interframe change information, and interframe motion vector information.

12. The method of claim 10, wherein said converting includes converting the picture data format based on coding difficulty information using both said temporal conversion and spatial conversion.

13. A picture coding method as described in claim 10, said temporally converting step eliminating redundant frames and/or fields.

14. A method for coding a picture, comprising:

determining coding difficulty information from input source picture data;

temporally converting a picture format of the source picture data to reduce temporally-redundant information by:

filtering the source picture data through a bandwidth filter:

processing the filtered picture data through a pel count counter:

decimating redundant frames and fields of the picture data through a frame/field decimation unit:

converting the decimated picture data to block scan data by a scan converter; and controlling the frame/field decimation unit, pel count converter and scan converter based on a coding difficulty information determined from the source picture data by a preprocess controller;

encoding picture data converted by the picture conversion unit; and controlling the converting of the picture format based on the coding difficulty information using at least temporal conversion.

15. The method of claim 14, said temporally converting step eliminating redundant frames and/or fields from the source picture data.

* * * * *